US012094012B2

(12) United States Patent
Ray et al.

(10) Patent No.: US 12,094,012 B2
(45) Date of Patent: Sep. 17, 2024

(54) DYNAMIC ORGANIZATION STRUCTURE MODEL

(71) Applicant: ADP, INC., Roseland, NJ (US)

(72) Inventors: Snigdha Ghosh Ray, Hyderabad (IN); Amit Kumar Sharma, Hyderabad (IN); Vinay Kanth Nadikuda, Hyderabad (IN); Prasad J. M. V. Velagareddi, Hyderabad (IN); Clint Myers, Suwanee, GA (US); Max Li, Atlanta, GA (US); Chaayanath K. Mysore, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/131,092

(22) Filed: Apr. 5, 2023

(65) Prior Publication Data

US 2023/0316420 A1     Oct. 5, 2023

Related U.S. Application Data

(63) Continuation of application No. 15/364,154, filed on Nov. 29, 2016, now abandoned.

(51) Int. Cl.
*G06Q 40/12* (2023.01)
(52) U.S. Cl.
CPC .................. *G06Q 40/12* (2013.12)
(58) Field of Classification Search
CPC ....................................................... G06Q 40/12
USPC ......................................................... 705/30
See application file for complete search history.

(56) References Cited

U.S. PATENT DOCUMENTS

| 5,819,231 | A | 10/1998 | Tremaine |
| 8,280,822 | B2 | 10/2012 | McKeown et al. |
| 8,635,080 | B2 | 1/2014 | McKeown et al. |
| 2003/0004847 | A1 | 1/2003 | Calderaro et al. |
| 2007/0011036 | A1 | 1/2007 | Lo |
| 2010/0076821 | A1* | 3/2010 | Hecker ............ G06Q 10/06398 705/7.42 |

(Continued)

OTHER PUBLICATIONS

Moore, Ian C; Tompa, Emile. Understanding changes over time in workers' compensation claim rates using time series analytical techniques. Occupational and Environmental Medicine; London vol. 68, Iss. 11, (Nov. 2011): 837. (Year: 2011).*

(Continued)

*Primary Examiner* — Florian M Zeender
*Assistant Examiner* — Fawaad Haider
(74) *Attorney, Agent, or Firm* — Foley & Lardner LLP

(57) ABSTRACT

A method and apparatus visualizing compensation adjustments for employees of organization. A computer system identifies a number of merit groups for a group of employees based on employee evaluation for employees in the group of employees. The computer system identifies a number of compensation adjustment parameters. The computer system applies the number of compensation adjustment parameters to a compensation distribution of the group of employees to determine a compensation adjustment for each merit group. The computer system determines impact of the compensation adjustment on the compensation distribution of the group of employees. The computer system displays the impact of the compensation adjustment in a compensation adjustment scenario.

20 Claims, 13 Drawing Sheets

(56) References Cited

U.S. PATENT DOCUMENTS

2010/0100427 A1* 4/2010 Mckeown .......... G06Q 10/067
705/320
2010/0100561 A1 4/2010 Cooper et al.
2010/0223572 A1 9/2010 Upadhyaya et al.
2013/0198097 A1 8/2013 Upadhyaya et al.
2014/0289155 A1 9/2014 Cooper et al.
2014/0324645 A1 10/2014 Stiffler et al.

OTHER PUBLICATIONS

Moore, Ian C; Tompa, Emile. Understanding changes over time in workers' compensation claim rates using time series analytical techniques. Occupational and Environmental Medicine; London vol. 68, Iss. 11, (Nov. 2011): 837. (Year: 2011).*

Payscale, Inc., "How to Use an Employee Performance Matrix", Apr. 23, 2010, retrieved from http://www.payscale.com/compensation-today/2010/04/employee-performance-matrix, 5 pages.

Barton, "New compensation strategies evolving", ACA News, Scottsdale, vol. 36, Iss. 6, Jun. 1993, pp. 1-3.

Hodge et al., "Using Dynamic Analysis Makes Tax Reform 30 Percent Less Challenging", Special Reports—Tax Foundation, Washington, Iss. 210, Aug. 2013, pp. 1-12.

Prien et al., "Conducting the Assessment—Individual Assessment: As Practiced in Industry and Consulting", Mahwah: Taylor & Francis Group, May 14, 2003, pp. 93-116.

US Office Action issued in corresponding U.S. Appl. No. 15/364,154, dated Apr. 30, 2020 (13 pages).

US Office Action issued in corresponding U.S. Appl. No. 15/364,154, dated Aug. 17, 2022 (21 pages).

US Office Action issued in corresponding U.S. Appl. No. 15/364,154, dated Jan. 5, 2023 (29 pages).

US Office Action issued in corresponding U.S. Appl. No. 15/364,154, dated May 16, 2019 (14 pages).

US Office Action issued in corresponding U.S. Appl. No. 15/364,154, dated Oct. 5, 2018 (19 pages).

US Office Action issued in corresponding U.S. Appl. No. 15/364,154, dated Oct. 7, 2020 (16 pages).

US Office Action issued in corresponding U.S. Appl. No. 15/364,154, dated Sep. 24, 2019 (9 pages).

* cited by examiner

FIG. 6

| Merit Increase Guidelines | Segment 1 | | Segment 2 | | Segment 3 | | Segment 4 | |
|---|---|---|---|---|---|---|---|---|
| Compa-Ratio | 0.00 To | 0.80 | | To 1.00 | | To 1.20 | | And Up |
| Rating Scale | | | | | | | | |
| 5 Target %: | 5.10 | | 4.99 | | 4.88 | | 4.77 | |
| Recommended %: | 4.84 To | 5.87 | 4.74 To | 5.74 | 4.64 To | 5.61 | 4.53 To | 5.49 |
| Allowed %: | 4.59 To | 5.61 | 4.49 To | 5.49 | 4.39 To | 5.37 | 4.29 To | 5.25 |
| 4 Target %: | 2.80 | | 2.74 | | 2.68 | | 2.62 | |
| Recommended %: | 2.66 To | 3.22 | 2.60 To | 3.15 | 2.55 To | 3.08 | 2.49 To | 3.01 |
| Allowed %: | 2.52 To | 3.08 | 2.47 To | 3.01 | 2.41 To | 2.95 | 2.36 To | 2.88 |
| 3 Target %: | 1.54 | | 1.50 | | 1.47 | | 1.44 | |
| Recommended %: | 1.46 To | 1.77 | 1.43 To | 1.73 | 1.40 To | 1.69 | 1.37 To | 1.66 |
| Allowed %: | 1.39 To | 1.69 | 1.35 To | 1.65 | 1.32 To | 1.62 | 1.30 To | 1.58 |
| 2 Target %: | 0.84 | | 0.83 | | 0.81 | | 0.79 | |
| Recommended %: | 0.80 To | 0.97 | 0.79 To | 0.95 | 0.77 To | 0.93 | 0.75 To | 0.91 |
| Allowed %: | 0.76 To | 0.92 | 0.75 To | 0.91 | 0.73 To | 0.89 | 0.71 To | 0.87 |
| 1 Target %: | 0.46 | | 0.45 | | 0.44 | | 0.43 | |
| Recommended %: | 0.44 To | 0.53 | 0.43 To | 0.52 | 0.42 To | 0.51 | 0.41 To | 0.49 |
| Allowed %: | 0.41 To | 0.51 | 0.41 To | 0.49 | 0.40 To | 0.48 | 0.39 To | 0.47 |

DYNAMIC ORGANIZATION STRUCTURE MODEL

CROSS-REFERENCE TO RELATED APPLICATIONS

This application claims priority and benefit under 35 U.S.C. § 120 as a continuation of U.S. Ser. No. 15/364,154, filed Nov. 29, 2016, the contents of which are hereby incorporated by reference herein in entirety.

BACKGROUND INFORMATION

1. Field

The present disclosure relates generally to an improved computer system and, in particular, to a method, apparatus, and computer program product for modeling relationships among a set of entities. Still more particularly, the present disclosure relates to a method and apparatus for modeling multiple relationship dimensions among a set of entities to users of the computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, employee compensation and other information about the organization.

Information in databases can be accessed through a graphical user interface of a computer system. The information systems may be used in performing operations for an organization. The operations may include hiring operations and project assignments.

However, the information organization methods and data models currently used to access information for an organization do not provide a method for easily visualizing and comparing compensation adjustments for employees of the organization. To accomplish a single organizational goal, the business environment often relies on selection of a compensation adjustment from many different compensation scenarios. The impact to the organization may not always be readily apparent when viewing compensation adjustments using current information organization methods and data models.

As a result, the time and resources needed to perform compensation adjustments for an organization utilizing currently available methods and data models may be greater than desired. Current methods and systems for organizing information often do not provide a system for visualizing compensation adjustments, requiring significant computational resources and managerial time dedicated to perform compensation adjustments. Therefore, performing compensation adjustments for an organization using currently available methods and models may require more time and resources than desired.

Therefore, it would be desirable to have a method and apparatus that take into account at least some of the issues discussed above, as well as other possible issues. For example, it would be desirable to have a method and apparatus that overcome issues with compensation adjustment visualization that result in an expenditure of organization resources that may be greater than desired.

SUMMARY

An embodiment of the present disclosure provides a method for visualizing compensation adjustments for employees of an organization. The method comprises identifying, by a computer system, a number of merit groups for a group of employees based on employee evaluations for employees in the group of employees. Further, the method comprises identifying, by the computer system, a number of compensation adjustment parameters. Still further, the method comprises applying, by the computer system, the number of compensation adjustment parameters to a compensation distribution of the group of employees to determine a compensation adjustment for each merit group. Still further, the method comprises determining, by the computer system, an impact of the compensation adjustment on the compensation distribution of the group of employees. Still further, the method comprises displaying, by the computer system, the impact of the compensation adjustment in a compensation adjustment scenario.

Another embodiment of the present disclosure provides a computer system comprising a display system for visualizing compensation adjustments for employees of an organization. The computer system comprises a compensation modeler that identifies a number of merit groups for a group of employees based on employee evaluations for employees in the group of employees. Further, the compensation modeler identifies a number of compensation adjustment parameters. Still further, the compensation modeler applies the number of compensation adjustment parameters to a compensation distribution of the group of employees to determine a compensation adjustment for each merit group. Still further, the compensation modeler determines an impact of the compensation adjustment on the compensation distribution of the group of employees. Still further, the compensation modeler displays, on the display system, the impact of the compensation adjustment in a compensation adjustment scenario.

Yet another embodiment of the present disclosure provides a computer program product for visualizing compensation adjustments for employees of an organization. The computer program product comprises a computer readable storage media, first program code, second program code, third program code, fourth program code, and fifth program code. The first program code, the second program code, the third program code, the fourth program code, and the fifth program code are stored on the computer readable storage media. The first program code, when executed by a computer system, identifies a number of merit groups for a group of employees based on employee evaluations for employees in the group of employees. The second program code, when executed by the computer system, identifies a number of compensation adjustment parameters. The third program code, when executed by the computer system, applies the number of compensation adjustment parameters to a compensation distribution of the group of employees to determine a compensation adjustment for each merit group. The fourth program code, when executed by the computer system, determines an impact of the compensation adjustment on the compensation distribution of the group of employees. The fifth program code, when executed by the computer system, displays the impact of the compensation adjustment in a compensation adjustment scenario.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 6 is an illustration of a data structure of information from which an impact of different compensation adjustments can be determined, depicted in accordance with an illustrative embodiment;

DETAILED DESCRIPTION

The illustrative embodiments recognize and take into account one or more different considerations. For example, the illustrative embodiments recognize and take into account that information organization methods and data models storing information for an organization that provide a holistic view of the interdependencies among organization units is desirable. The illustrative embodiments recognize and take into account that accomplishing a single organizational goal, the business environment often relies on many dependencies among tasks performed by separate organization units. The illustrative embodiments recognize and take into account that viewing information in a manner that makes interdependencies and relations between these organization units readily apparent is also desirable. Additionally, the illustrative embodiments recognize and take into account that providing an understanding between the interdependencies and relationships among organizational units contributes to effective accomplishment of organizational goals.

The illustrative embodiments recognize and take into account, however, that the time and resources needed to provide information organization methods and data models for an organization may be greater than desired. The illustrative embodiments recognize and take into account that current methods and systems for organizing information often results in a bloated data model, requiring significant computational resources and programming time. Illustrative embodiments recognize and take into account that implementing an information organization for viewing of the interdependencies among organization units using currently available information organization methods and data models may require more time and resources than desired.

Thus, the illustrative embodiments provide a method and apparatus for modeling multiple relationship dimensions among a set of entities. In one illustrative example, a method for modeling multiple relationship dimensions among a set of entities is presented. A computer system identifies a configuration for the structure. The configuration comprises metadata about supported relationship aspects for the set of entities within a structure context. Further, the computer system identifies aspects for an entity according to the structure context. The entity aspects comprise metadata about relationships for the entity within the structure context. Still further, the computer system compares the entity aspects to the configuration for the structure to determine a relationship of the entity to the set of entities. Still further, the computer system dynamically attaches the entity to the set of entities according to the determined relationship to form the structure.

Figure 1:
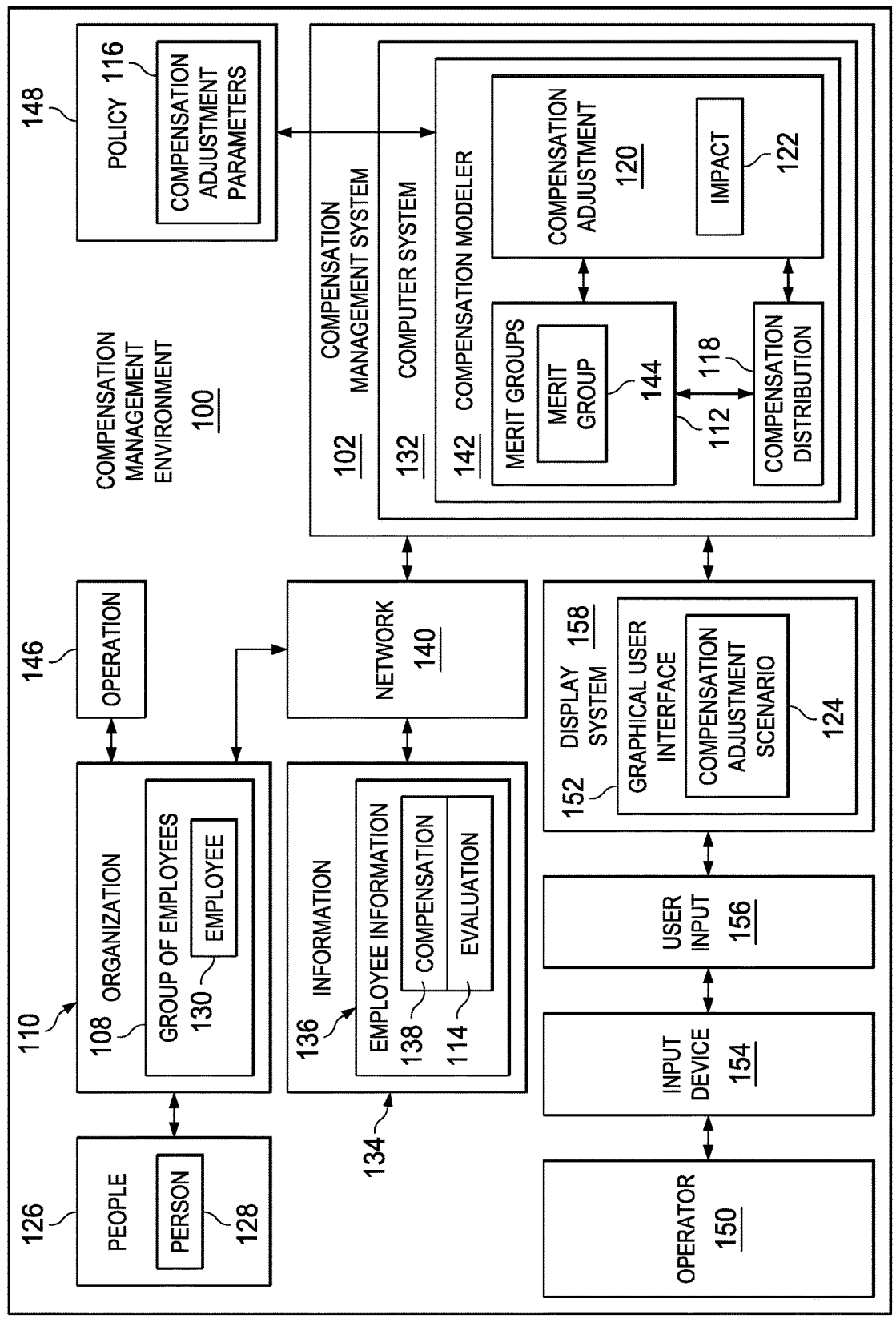
FIG. 1 is an illustration of a block diagram of a compensation management environment, depicted in accordance with an illustrative embodiment.

With reference now to the figures and, in particular, with reference to FIG. 1, an illustration of a block diagram of a compensation management environment is depicted in accordance with an illustrative embodiment. In this illustrative example, compensation management environment 100 includes compensation management system 102. Compensation management system 102 allows for visualization of compensation adjustments for employees of an organization, such as organization 110. Compensation management system 102 identifies and models compensation adjustment scenarios or group of employees 108 of organization 110. Compensation management system 102 identifies a number of merit groups 112 for group of employees 108 based on evaluations 114 for each employee, such as employee 130, in group of employees 108. Compensation management system 102 identifies a number of compensation adjustment parameters, such as compensation adjustment parameters 116. Compensation management system 102 then applies compensation adjustment parameters 116 to a compensation distribution, such as compensation distribution 118, of group of employees 108 to determine a compensation adjustment, such as compensation adjustment 120, for each of merit groups 112. Compensation management system 102 determines impact 122 of compensation adjustment 120 and compensation distribution 118 on group of employees 108. Compensation management system 102 then displays the impact 122 of compensation adjustment 120 in a compensation adjustment scenario 124.

Organization 110 may be, for example, a corporation, a partnership, a charity, a city, a government agency, or some other suitable type of organization. Group of employees 108 may be, for example, at least one of teams, departments, divisions, or some other suitable type of organizational unit within organization 110. Additionally, group of employees 108 may include positions and personnel having a relationship with organization 110. In this illustrative example, group of employees 108 are employees of organization 110 having similar human resources characteristics. For example, group of employees 108 may be employees of organization 110 that have received similar scores on an employee evaluation.

In this illustrative example, group of employees 108 may include one or more of people 126 or person 128. Groups of employees 108 can be, for example at least one of people, employees, customers, vendors, or some other suitable type of group of people. Person 128 is a person included in one or more of groups of employees 108. In this illustrative example, groups of employees 108 may include one or more of people 126 or person 128. In this illustrative example, employee 130 is a persona of person 128 within the context of organization 110.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In this illustrative example, compensation management system 102 includes computer system 132. Computer system 132 may be selected from one of an employee information system, a research information system, a sales information system, an accounting system, a payroll system, a human resources system or some other type of information system that stores and provides access to information 134. As depicted, computer system 132 may be used to access information 134. The access may include at least one of reading, writing, modifying, or operating on information 134.

In this illustrative example, information 134 includes employee information 136. Employee information 136 may include, for example, at least one of information about group of employees 108 or employee 130, including at least one of, products, benefits, payroll, compensation, research, product analysis, business plans, financials, or some other information relating to a group of employees 108 or employee 130 within organization 110. In one illustrative example, employee information 136 includes compensation 138 and evaluation 114.

Compensation 138 is information related to the compensation of employee 130 by organization 110. Compensation 138 may include information related to salary, wages, benefits, or other some other information relating to compensation 138 of the employee 130. Evaluation 114 is information related to the performance of employee 130 within the context of organization 110. For example, evaluation 114 can include at least one of goals, responsibilities, managerial evaluations, accomplishments, or some other information relating to the performance of employee 130. In this illustrative example, the evaluation 114 includes a quantized evaluation of the performance of employee 130 within the context of organization 110.

As depicted, computer system 132 is a physical hardware system that includes one or more data processing systems. When more than one data processing system is present, those data processing systems may be in communication with each other using a communications medium. The communications medium may be a network, such as network 140. The data processing systems may be selected from at least one of a computer, a server computer, a workstation, a tablet computer, a laptop computer, a mobile phone, or some other suitable data processing system. Output from computer system 132 may be displayed on display system 158.

As depicted, display system 158 is a physical hardware system and includes one or more display devices. The display devices may include at least one of a light emitting diode (LED) display, a liquid crystal display (LCD), an organic light emitting diode (OLED) display, or some other suitable display device.

Computer system 132 may access information 134 through network 140. Network 140 is located in at least one of compensation management system 102 or outside of compensation management system 102. For example, network 140 may include at least one of a local area network (LAN), a wide area network (WAN), the Internet, an intranet, or some other suitable type of network.

In this illustrative example, computer system 132 includes compensation modeler 142. Compensation modeler 142 models impact 122 of compensation adjustment 120 on compensation distribution 118 among merit groups 112. Compensation modeler 142 may be implemented in software, hardware, firmware, or a combination thereof. When software is used, the operations performed by compensation modeler 142 may be implemented in program code configured to be loaded and run on hardware, such as a processor unit. When firmware is used, the operations performed by compensation modeler 142 may be implemented in program code and data and stored in persistent memory to run on a processor unit. When hardware is employed, the hardware may include circuits that operate to perform the operations in compensation modeler 142.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, compensation modeler 142 models impact 122 of compensation adjustment 120 on compensation distribution 118 among merit groups 112. Each of merit groups 112 is a group of employees, such as one of one of group of employees 108, having similar evaluation 114 of employee information 136. For example, merit group 144 may include employee 130, as well as other employees of group of employees 108. In this illustrative example, each of the employees included in merit group 144 have similar evaluation 114. Likewise, employees included in other merit groups 112 also have similar evaluation 114. However, evaluation 114 of employees in merit group 144 is different from the evaluation 114 of employees in other merit groups 112.

In this illustrative example, compensation adjustment 120 is an adjustment to compensation 138 for one or more of merit groups 112 and merit group 144. Compensation adjustment 120 may include similar adjustments to compensation 138 for each of group of employees 108 included in merit group 144. Compensation adjustment 120 may include different adjustments for different ones of merit groups 112.

In this illustrative example, compensation modeler 142 models impact 122 of compensation adjustment 120 on compensation distribution 118. Compensation distribution 118 can include a distribution of compensation 138 for each employee 130 in merit group 144. Compensation distribution 118 can include a distribution of compensation 138 for each employee 130 in others of merit groups 112.

Impact 122 is a change in compensation distribution 118 based on compensation adjustment 120. Impact 122 can include statistics can include an average compensation for each of group of employees 108 included in merit groups 112 or merit group 144. Impact 122 can include a deviation from the average compensation the individual compensation of employee 130.

Compensation modeler 142 models compensation adjustment 120 as applied to merit groups 112 to determine impact 122. Compensation modeler 142 displays impact 122 on compensation distribution 118 as compensation adjustment scenario 124 displayed on display system 158. By compensation adjustment scenario 124, compensation modeler 142 enables more efficient performance of operation 146 for organization 110. In this illustrative example, operation 146 is an operation performed for the benefit of organization 110. Operation 146 can be selected from at least one of hiring, benefits administration, payroll, performance reviews, forming teams for new products, assigning research projects, or other suitable operations for organization 110. According to one particular example, operation 146 can implement compensation adjustment 120 to compensation 138 for employee 130, as displayed in compensation adjustment scenario 124.

In one illustrative example, compensation modeler 142 models compensation adjustment 120 as applied to merit groups 112 to determine impact 122 according to compensation adjustment parameters 116. In this illustrative example, compensation adjustment parameters 116 is a set of rules within policy 148 for the determination of impact 122 of compensation adjustment 120. Policy 148 is a group of rules. Policy 148 also may include data used to apply the group of rules. As used herein, the "group of," when used with reference to items, means one or more items. For example, a "group of rules" is one or more rules.

Compensation adjustment parameters 116 may include, for example, one or more rules for determining impact 122 of compensation adjustment 120 for at least one of merit groups 112 and merit group 144. In one illustrative embodiment, compensation adjustment parameters 116 may include, for example, a rule indicating a compensation adjustment budget. In this illustrative embodiment, the compensation adjustment budget is a rule in policy 148 indicating a total budget that can be allocated to compensation adjustment 120 among merit groups 112.

In one illustrative example, compensation adjustment parameters 116 may include, for example, a rule indicating an allocation scheme. In this illustrative example, the allocation scheme is a rule in policy 148 indicating a methodology for the distribution of the total compensation adjustment budget among different ones of merit groups 112.

In one illustrative example, compensation adjustment parameters 116 may include, for example, a rule indicating a compensation adjustment range. In this illustrative example, the compensation adjustment range is a rule in policy 148 indicating at least one of a minimum adjustment and a maximum adjustment to compensation 138 of employee 130.

As depicted, compensation modeler 142 determines impact 122 of compensation adjustment 120 by applying compensation adjustment parameters 116 to compensation 138 based on the inclusion of employee 130 in merit group 144. For example, compensation modeler 142 determines impact 122 of compensation adjustment 120 based on an application of one or more rules within policy 148. When compensation modeler 142 determines compensation adjustment 120 according to compensation adjustment parameters 116, impact 122 on compensation distribution 118 can be controlled according to policy 148. In this manner, compensation modeler 142 determines impact 122 of compensation adjustment 120 on compensation distribution 118 in a manner that meets policy 148.

In the illustrative example, operator 150 may interact with compensation adjustment scenario 124 through graphical user interface 152 displayed on display system 158 to access information 134 about impact 122 on compensation distribution 118 among merit groups 112. Operator 150 may interact with compensation adjustment scenario 124 by selecting one or more compensation adjustment parameters 116 applied by compensation modeler 142 when determining compensation adjustment 120.

In the illustrative example, compensation modeler 142 presents compensation adjustment scenario 124 about impact 122 on compensation distribution 118 within graphical user interface 152. Compensation modeler 142 presents compensation adjustment scenario 124 that impact 122 of compensation adjustment 120 according to selected compensation adjustment parameters 116 can be efficiently and easily utilized in performing operation 146.

Operator 150 is a human being who interacts with compensation adjustment scenario 124 through user input 156 generated by input device 154. As depicted, input device 154 is a physical hardware system and includes at least one of a mouse, a keyboard, a trackball, a touchscreen, a stylus, a motion sensing input device, a cyberglove, or some other suitable type of input device.

As a result, impact 122 describing compensation adjustment 120 for merit groups 112 is displayed as compensation adjustment scenario 124 in graphical user interface 152 according to compensation adjustment parameters 116, and may be relied upon to perform operation 146 for organization 110 more efficiently and easily based on an identification of impact 122 and compensation distribution 118 using compensation modeler 142. In other words, compensation modeler 142 applies compensation adjustment parameters 116 to employee information 136 based on merit groups 112 such that impact 122 is determined according to selected compensation adjustment parameters 116 as defined by policy 148. In this manner, performing operation 146 for organization 110 is more efficiently and easily enabled based on generating compensation adjustment scenario 124 displayed on display system 158.

The illustrative example in FIG. 1 and the examples in the other subsequent figures provide one or more technical solutions to overcome a technical problem of modeling multiple relationship dimensions among a set of entities consistent with organization units that make for the efficient performance of operations in an information system more cumbersome and time-consuming than desired. For example, compensation modeler 142 applies compensation adjustment parameters 116 to employee information 136 based on merit groups 112 such that impact 122 is determined according to selected compensation adjustment parameters 116 as defined by policy 148.

In this manner, the use of compensation modeler 142 has a technical effect of reducing time, effort, or both in generating compensation adjustment scenario 124 for displaying impact 122 of compensation adjustment 120 on display system 158. In this manner, operation 146 performed for organization 110 may be performed more efficiently as compared to currently used systems. For example, compensation adjustment scenario 124 may be used to display information 134, including impact 122 of compensation adjustment 120 on compensation distribution 118, enabling more efficient performance of operation 146, selected from at least one of hiring, benefits administration, payroll, performance reviews, forming teams for new products, assigning research projects, or other suitable operations for organization 110.

As a result, computer system 132 operates as a special purpose computer system in which compensation modeler 142 in computer system 132 enables modeling the impact 122 of compensation adjustment 120 among merit groups 112 in a manner that is consistent with compensation adjustment parameters 116 for display in graphical user interface 152 of display system 158. For example, compensation modeler 142 applies compensation adjustment parameters 116 to employee information 136 based on merit groups 112 such that impact 122 is determined according to selected compensation adjustment parameters 116 as defined by policy 148. For example, compensation adjustment 120 is applied to compensation distribution 118 to form compensation adjustment scenario 124 only when impact 122 of compensation adjustment 120 meets one or more rules in policy 148 defining compensation adjustment parameters 116.

Thus, compensation modeler 142 transforms computer system 132 into a special purpose computer system as compared to currently available general computer systems that do not have compensation modeler 142. Currently used general computer systems do not reduce the time or effort needed to generate compensation adjustment scenario 124 for displaying impact 122 of compensation adjustment 120 on display system 158. Further, currently used general computer systems do not apply compensation adjustment 120 to compensation distribution 118 to form compensation adjustment scenario 124 only when impact 122 of compensation adjustment 120 meets one or more rules in policy 148 defining compensation adjustment parameters 116.

Figure 2:
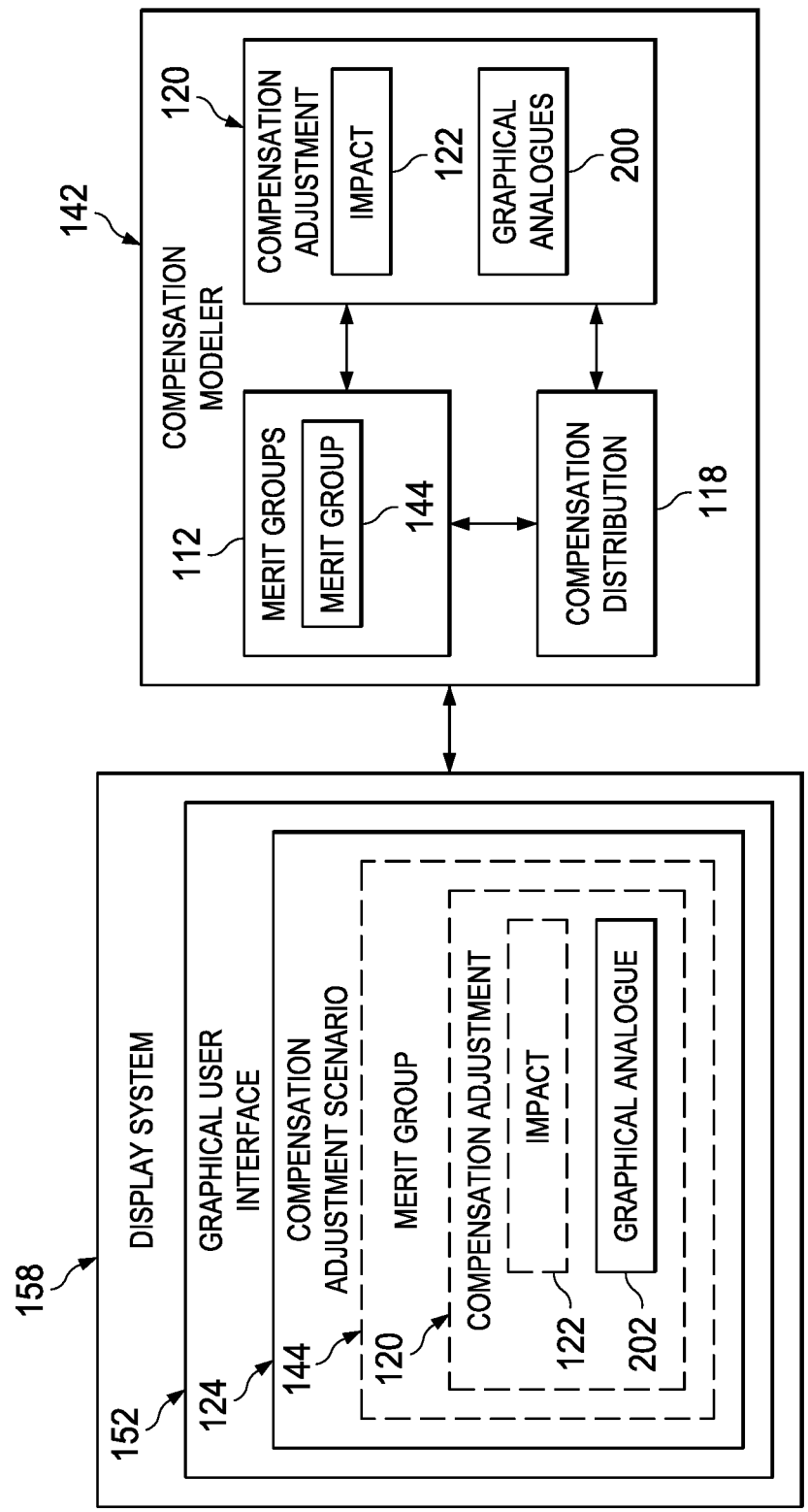
FIG. 2 is an illustration of a data flow diagram for displaying a compensation adjustment scenario, depicted in accordance with an illustrative embodiment.

With reference to FIG. 2, a data flow diagram for displaying a compensation adjustment scenario is depicted in accordance with an illustrative embodiment. In this figure, an example of a compensation adjustment scenario 124 determined according to impact 122 of compensation adjustment 120 by compensation modeler 142 is shown. In the illustrative examples, the same reference numeral may be used in more than one figure. This reuse of a reference numeral in different figures represents the same element in the different figures.

As depicted, compensation modeler 142 has a number of different components. As used herein, a "number of items" means one or more items. For example, "a number of different components" means one or more components. As depicted, compensation modeler 142 includes merit groups 112, compensation distribution 118, and compensation adjustment 120.

As depicted, compensation adjustment scenario 124 is displayed within graphical user interface 152 of display system 158. In one illustrative example, compensation adjustment scenario 124 can include a visual depiction of impact 122 of compensation adjustment as applied to one or more of merit groups 112 and merit group 144. As depicted, compensation adjustment scenario 124 includes a visual depiction of impact 122 of compensation adjustment 120 as applied to merit group 144.

In one illustrative example, compensation adjustment scenario 124 includes one or more of graphical analogues 200, such as graphical analogue 202. Each one of graphical analogues 200 visually indicates a relative value of compensation adjustment 120 as applied to a corresponding one of merit groups 112. As depicted, graphical analogue 202 visually indicates compensation adjustment 120 as applied to merit group 144 relative to compensation adjustment 120 as applied to others of merit groups 112.

In one illustrative example, compensation modeler 142 displays compensation distribution 118 for each of merit groups 112 in compensation adjustment scenario 124. As depicted, compensation adjustment scenario 124 displays compensation distribution 118 for merit group 144. Although not shown, compensation adjustment scenario 124 may also include compensation distribution 118 among other of merit groups 112.

Continuing with this example, compensation modeler 142 displays compensation adjustment 120 for each of merit groups 112 according to compensation distribution 118 in compensation adjustment scenario 124. As depicted, compensation adjustment scenario 124 displays compensation adjustment 120 for merit group 144. Although not shown, compensation adjustment scenario 124 may also include compensation adjustment for other of merit groups 112 according to compensation distribution 118.

Continuing with this example, compensation modeler 142 applies graphical analogues 200 for compensation adjustment 120 to each of merit group 112 according to compensation distribution 118. In this manner, compensation modeler 142 enables display of impact 122 of compensation adjustment 120 across compensation distribution 118 for merit group 144 relative to other merit groups 112 according to compensation adjustment parameters 116 as defined by policy 148, both shown in block form in FIG. 1.

Operator 150, shown in block form in FIG. 1, may interact with compensation adjustment scenario 124 through graphical user interface 152 displayed on display system 158 to access impact 122 of compensation adjustment 120 on compensation distribution 118. Compensation modeler 142 presents compensation adjustment scenario 124 within a graphical user interface 152 such that information, such as impact 122 of compensation adjustment 120, can be efficiently and easily utilized when performing operations for organization 110, shown in block form in FIG. 1.

Figure 3:
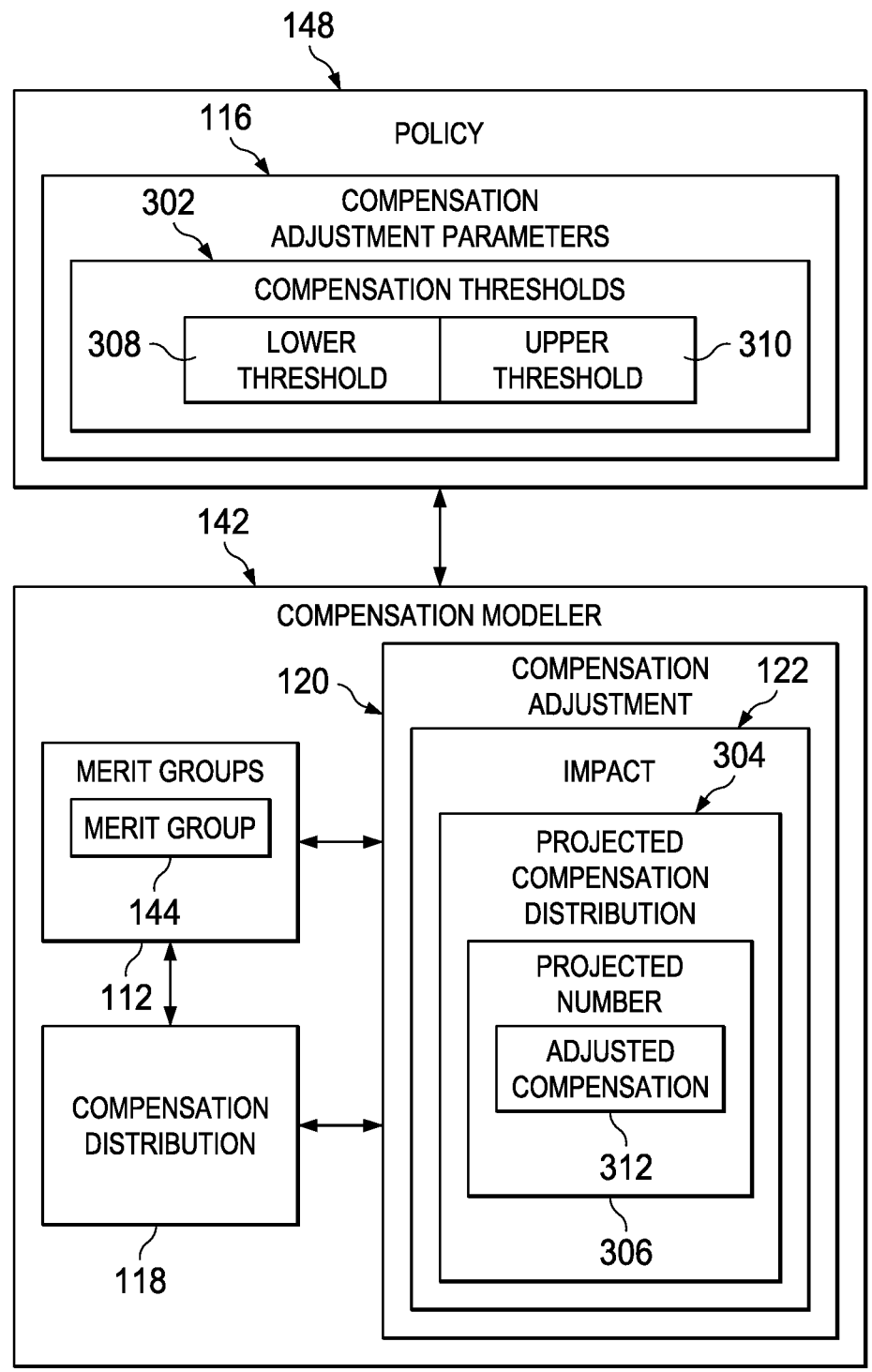
FIG. 3 is an illustration of a data flow diagram for determining the impact of the compensation adjustment on the compensation distribution of the group of employees according to compensation thresholds, depicted in accordance with an illustrative embodiment.

Turning now to FIG. 3, a data flow diagram for determining the impact of the compensation adjustment on the compensation distribution of the group of employees according to compensation thresholds is depicted in accordance with an illustrative embodiment. Compensation thresholds 302 are an example of compensation adjustment parameters 116, as defined by policy 148.

As depicted, impact 122 of compensation adjustment 120 includes projected compensation distribution 304. Projected compensation distribution 304 is the distribution of individual compensation 138 for group of employees 108, shown in block form in FIG. 1, within at least one of merit groups 112 and merit group 144 after application of compensation adjustment 120 according to compensation adjustment parameters 116.

In this illustrative example, compensation modeler 142 determines projected number 306 based on compensation thresholds 302. Compensation thresholds 302 are thresholds related to compensation 138 for employee 130, shown in block form in FIG. 1. For example, compensation thresholds 302 may define maximum and minimum compensation for employee 130 based on a pay grade of employee 130, a job title of employee 130, a position of the employee 130 within organization 110 of FIG. 1, or some other suitable method for determining compensation thresholds 302 for employee 130 of within organization 110.

As depicted, compensation thresholds 302 include lower threshold 308 and upper threshold 310. Lower threshold 308 is a rule within compensation adjustment parameters 116 that defines a minimum compensation for employee 130. Similarly, upper threshold 310 is a rule in compensation adjustment parameters 116 that defines a maximum compensation for employee 130 based on a pay grade of employee 130.

In this illustrative example, compensation modeler 142 applies compensation thresholds 302 to projected compensation distribution 304 to determine projected number 306. Projected number 306 is a number of group of employees 108, shown in block form in FIG. 1, in merit group 144 having adjusted compensation 312 that is either below lower threshold 308 or above upper threshold 310 based on compensation adjustment 120. As depicted, adjusted compensation 312 is compensation 138 for employee 130, after applying compensation adjustment 120.

In this manner, compensation modeler 142 enables display of projected compensation distribution 304, including projected number 306 of group of employees 108 having an adjusted compensation 312 outside of compensation thresholds 302 after application of compensation adjustment 120 according to compensation adjustment parameters 116 as defined by policy 148.

Operator 150, shown in block form in FIG. 1, may interact with compensation adjustment scenario 124 through graphical user interface 152 displayed on display system 158, all shown in block form in FIG. 1, to access impact 122 of compensation adjustment 120 on compensation distribution 118. Compensation modeler 142 presents compensation adjustment scenario 124 within a graphical user interface 152 such that impact 122 of compensation adjustment 120, including projected compensation distribution 304 and projected number 306, can be efficiently and easily utilized when performing operations for organization 110, shown in block form in FIG. 1.

Figure 4:
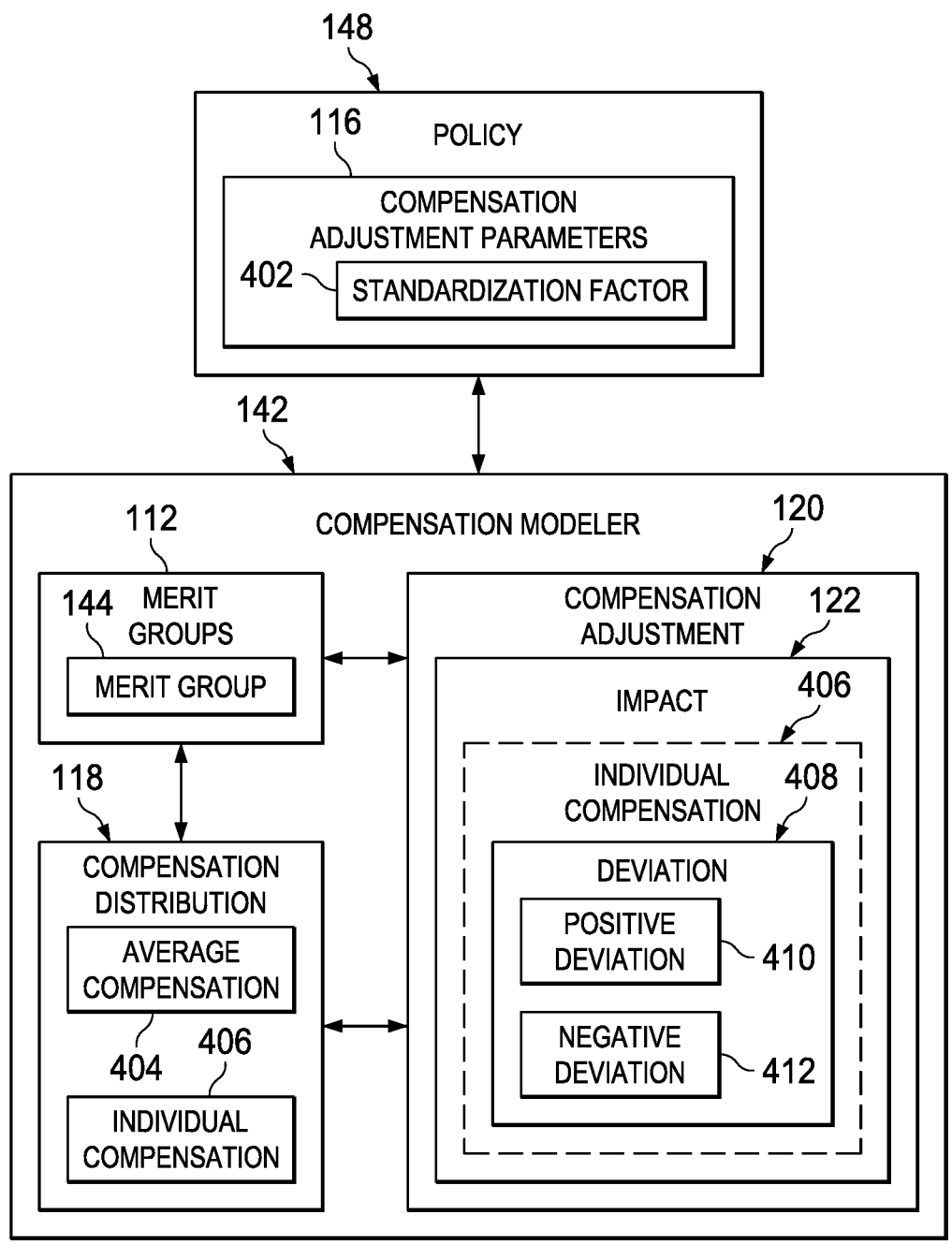
FIG. 4 is an illustration of a data flow diagram for applying a standardization factor to an individual compensation based on a corresponding deviation, depicted in accordance with an illustrative embodiment.

Turning now to FIG. 4, a data flow diagram for applying a standardization factor to an individual compensation based on a corresponding deviation is depicted in accordance with an illustrative embodiment. Standardization factor 402 is an example of compensation adjustment parameters 116, as defined by policy 148.

In this illustrative example, compensation distribution 118 includes a number of different components. As depicted, compensation distribution 118 includes average compensation 404, and individual compensation 406.

Average compensation 404 is an average compensation, such as compensation 138 shown in block form in FIG. 1, for group of employees 108, shown in block form in FIG. 1, included in merit group 144. Individual compensation 406 is a compensation, such as compensation 138 shown in block form in FIG. 1, of employee 130, shown in block form in FIG. 1, included in merit group 144.

As depicted, individual compensation 406 is compensation 138 of employee 130. However, it is appreciated that compensation distribution 118 will also include individual compensation 406 for each employee of the group of employees 108 included in merit group 144.

Individual compensation 406 includes deviation 408. Deviation 408 is a deviation of individual compensation 406 from average compensation 404. As depicted, deviation 408 can be either positive deviation 410, or negative deviation 412. When individual compensation 406 is greater than average compensation 404, individual compensation 406 is said to have positive deviation 410. When individual compensation 406 is less than average compensation 404, individual compensation 406 is said to have negative deviation 412.

In this illustrative example, compensation modeler 142 identifies average compensation 404 for group of employees 108, shown in block form in FIG. 1, in merit group 144.

Additionally, compensation modeler 142 identifies individual compensation 406 for each employee, such as employee 130 shown in block form in FIG. 1, included in merit group 144. Based on average compensation 404 and individual compensation 406, compensation modeler 142 can additionally identify deviation 408 for each employee, such as employee 130, shown in block form in FIG. 1, included in merit group 144.

As depicted, compensation adjustment parameters 116 includes standardization factor 402. Standardization factor 402 is an adjustment to compensation adjustment 120 applied to individual compensation 406 based on deviation 408.

In this illustrative example, compensation modeler 142 applies standardization factor 402 to individual compensation 406 based on deviation 408. When deviation 408 of individual compensation 406 is positive deviation 410, compensation modeler 142 applies standardization factor 402 to decrease compensation adjustment 120 of individual compensation 406. When deviation 408 of individual compensation 406 is negative deviation 412, compensation modeler 142 applies standardization factor 402 to increase compensation adjustment 120 of individual compensation 406.

By applying standardization factor 402 to compensation adjustment 120 for individual compensation 406, group of employees 108 in merit group 144 having individual compensation 406 that is below average compensation 404 can be upwardly adjusted us that individual compensation 406 of employee 130 more closely aligns with average compensation 404 of group of employees 108 that are also included in merit group 144.

Similarly, by applying standardization factor 402 to compensation adjustment 120 for individual compensation 406, group of employees 108 in merit group 144 having individual compensation 406 that is above average compensation 404 can be downwardly adjusted such that individual compensation 406 of employee 130 is increased, but does not outpace average compensation 404 of group of employees 108 that are also included in merit group 144.

In this manner, compensation modeler 142 enables standardization of individual compensation 406 based on the deviation 408 from average compensation 404. Compensation modeler 142 applies standardization factor 402 to deviation 408 of individual compensation 406 according to compensation adjustment parameters 116 as defined by policy 148.

Operator 150, shown in block form in FIG. 1, may interact with compensation adjustment scenario 124 through graphical user interface 152 displayed on display system 158, all shown in block form in FIG. 1, to access impact 122 of compensation adjustment 120, including standardization factor 402, on compensation distribution 118. Compensation modeler 142 presents compensation adjustment scenario 124 within a graphical user interface 152 such that information, such as impact 122 of compensation adjustment 120 can be efficiently and easily utilized when performing operations for organization 110, shown in block form in FIG. 1.

Figure 5:
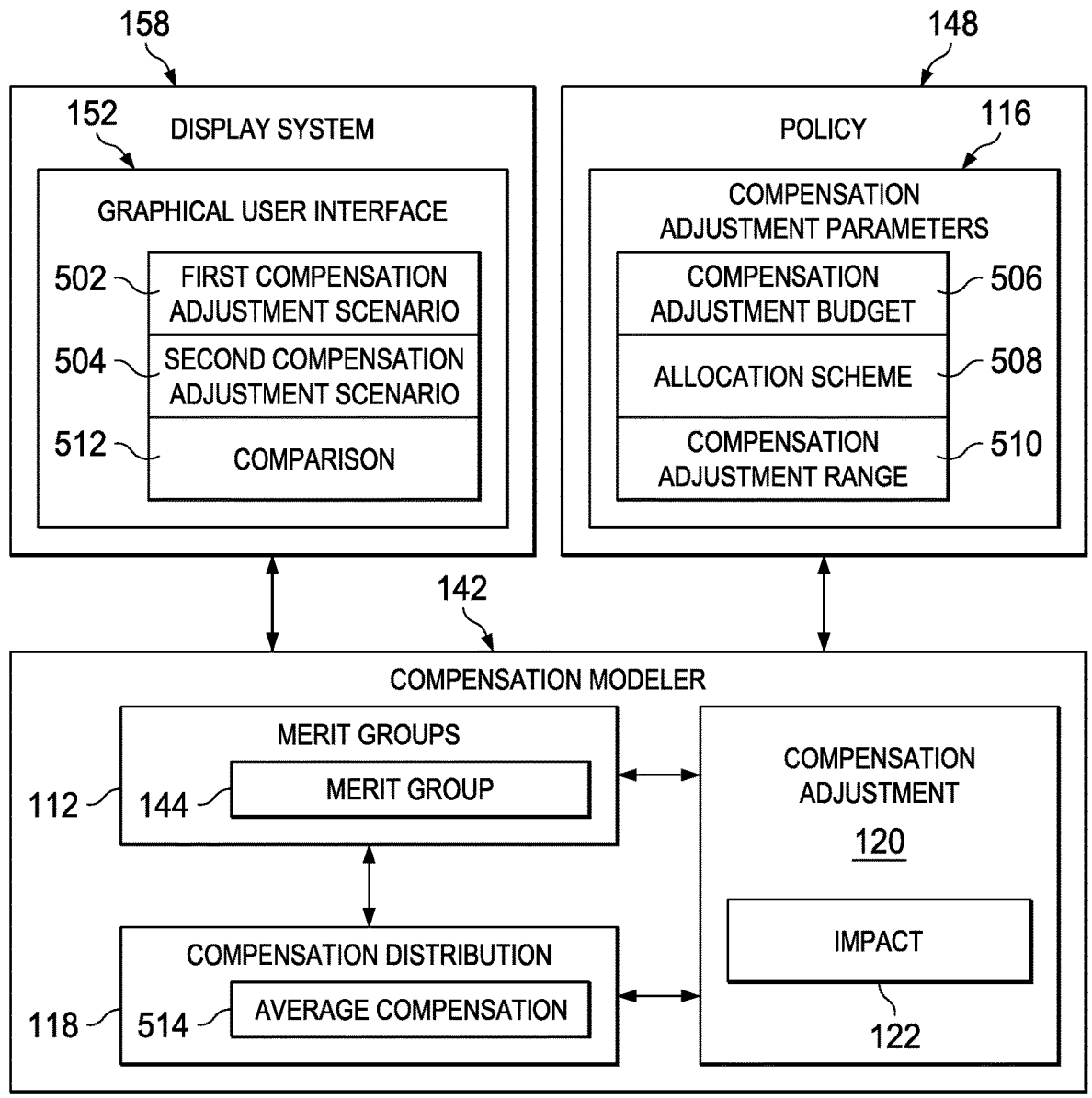
FIG. 5 is an illustration of a data flow diagram for displaying a comparison between the different compensation adjustment scenarios having different compensation adjustment parameters, depicted in accordance with an illustrative embodiment.

Turning now to FIG. 5, a data flow diagram for displaying a comparison between the different compensation adjustment scenarios having different compensation adjustment parameters is depicted in accordance with an illustrative embodiment. In this illustrative example, first compensation adjustment scenario 502 and second compensation adjustment scenario 504 are examples of compensation adjustment scenario 124, shown in block form in FIG. 1.

In this illustrative example, compensation adjustment parameters 116 includes a number of different components. As depicted, compensation adjustment parameters 116 includes compensation adjustment budget 506, allocation scheme 508, and compensation adjustment range 510.

As depicted, compensation adjustment parameters 116 includes compensation adjustment budget 506. Compensation adjustment budget 506 is a rule in policy 148 indicating a total budget that can be allocated to compensation adjustment 120 among merit groups 112.

As depicted, compensation adjustment parameters 116 includes allocation scheme 508. Allocation scheme 508 is a rule in policy 148 indicating a methodology for the distribution of compensation adjustment budget 506 among different ones of merit groups 112, including merit group 144. For example, allocation scheme 508 may allocate at least one of an equal amount, a lesser amount, or a greater amount of compensation adjustment budget 506 to merit group 144 relative to other of merit groups 112.

In this illustrative example, compensation modeler 142 applies a first number of compensation adjustment parameters 116 to compensation distribution 118 to determine a first one of compensation adjustment 120 for merit groups 112. Compensation modeler 142 determines impact 122 of the compensation adjustment 120 on compensation distribution 118 according to the first number of compensation adjustment parameters 116 and displays impact 122 as first compensation adjustment scenario 502 in graphical user interface 152 of display system 158.

In this illustrative example, compensation modeler 142 can identify a second number of compensation adjustment parameters 116. The second number of compensation adjustment parameters 116 can have at least one of a different compensation adjustment budget 506, allocation scheme 508, and compensation adjustment range 510 then does first number of compensation adjustment parameters 116.

Compensation modeler 142 applies the second number of compensation adjustment parameters 116 to compensation distribution 118 to determine a second one of compensation adjustment 120 for merit groups 112. Compensation modeler 142 determines impact 122 of the compensation adjustment 120 on compensation distribution 118 according to the second number of compensation adjustment parameters 116 and displays impact 122 as second compensation adjustment scenario 504 in graphical user interface 152 of display system 158.

Compensation modeler 142 can then display comparison 512. Comparison 512 is a comparison between a number of compensation adjustment scenarios. As depicted, comparison 512 is a comparison between first compensation adjustment scenario 502 and second compensation adjustment scenario 504.

In this manner, compensation modeler 142 enables display of comparison 512 between different compensation adjustment scenarios, such as first compensation adjustment scenario 502 that displays impact 122 according to a first number of compensation adjustment parameters 116 as defined by policy 148, and second compensation adjustment scenario 504 that displays impact 122 according to a second number of compensation adjustment parameters 116 as defined by policy 148.

Operator 150, shown in block form in FIG. 1, may interact with first compensation adjustment scenario 502, second compensation adjustment scenario 504, and comparison 512 through graphical user interface 152 displayed on display system 158. Compensation modeler 142 presents first compensation adjustment scenario 502, second compensation adjustment scenario 504, and comparison 512 within a graphical user interface 152 such that impact 122 of compensation adjustment 120 according to different compensation adjustment parameters 116, including compensation adjustment budget 506, allocation scheme 508, and compensation adjustment range 510 and, can be efficiently and easily compared and utilized when performing operations for organization 110, shown in block form in FIG. 1.

With reference now to FIG. 6, a data structure of information from which an impact of different compensation adjustments can be determined is shown according to an illustrative example. As depicted, data structure 600 is a data structure containing information, such as information 134 and employee information 136, both shown in block form in FIG. 1, that compensation modeler 142 can utilized to display impact 122 of compensation adjustment 120 as compensation adjustment scenario 124.

In this illustrative example, data structure 600 includes a number of employee ratings. As depicted, data structure 600 includes rating 602, rating 604, rating 606, rating 608, and rating 610. Each of rating 602, rating 604, rating 606, rating 608, and rating 610 correspond to a quantized evaluation of the performance of employee 130 within the context of organization 110. In this illustrative example, each of rating 602, rating 604, rating 606, rating 608, and rating 610 corresponds to a possible score received by employee 130 on an employee evaluation, stored as evaluation 114, shown in block form in FIG. 1.

In this illustrative example, data structure 600 includes a number of groups segment delineated by different compensation thresholds. As depicted, data structure 600 includes group segment 612, group segment 614, group segment 616, and group segment 618. In this illustrative example, group segment 612, group segment 614, group segment 616, and group segment 618 are delineated by compensation thresholds related to a median compensation for group of employees 108, shown in block form in FIG. 1. As depicted, group segment 612, group segment 614, group segment 616, and group segment 618 are delineated by based on a median compensation of a pay grade of group of employees 108, a median compensation for a job title of groups of employees 108, a median compensation for a position of groups of employees 108, both shown within organization 110, shown in block form in FIG. 1.

In this illustrative example, group segment 612 includes a number of compensation thresholds, such as compensation thresholds 302, shown in block form in FIG. 3. As depicted, group segment 612 includes a lower threshold, such as lower threshold 308 shown in block form in FIG. 3, of an amount greater than 0.00 of a median compensation for group of employees 108. As depicted, group segment 612 includes an upper threshold, such as upper threshold 300 and shown in block form in FIG. 3, of 0.80 of a median compensation for group of employees 108. In this illustrative example, group segment 612 is and has a negative deviation, such as negative deviation 412 shown in block form in FIG. 4.

In this illustrative example, group segment 614 includes a number of compensation thresholds, such as compensation thresholds 302, shown in block form in FIG. 3. As depicted, group segment 614 includes a lower threshold, such as lower threshold 308 shown in block form in FIG. 3, of an amount greater than 0.80 of a median compensation for group of employees 108. As depicted, group segment 612 includes an upper threshold, such as upper threshold 300 and shown in block form in FIG. 3, of 1.00 of a median compensation for group of employees 108. In this illustrative example, group segment 614 has a negative deviation, such as negative deviation 412 shown in block form in FIG. 4.

In this illustrative example, group segment 616 includes a number of compensation thresholds, such as compensation thresholds 302, shown in block form in FIG. 3. As depicted, group segment 616 includes a lower threshold, such as lower threshold 308 shown in block form in FIG. 3, of an amount greater than 1.00 of a median compensation for group of employees 108. As depicted, group segment 612 includes an upper threshold, such as upper threshold 300 and shown in block form in FIG. 3, of 1.20 of a median compensation for group of employees 108. In this illustrative example, group segment 616 has a positive deviation, such as positive deviation 410 shown in block form in FIG. 4.

In this illustrative example, group segment 618 includes a number of compensation thresholds, such as compensation thresholds 302, shown in block form in FIG. 3. As depicted, group segment 618 includes a lower threshold, such as lower threshold 308 shown in block form in FIG. 3, of an amount greater than 1.20 of a median compensation for group of employees 108. As depicted, group segment 618 does not include an upper threshold. In this illustrative example, group segment 618 has a positive deviation, such as positive deviation 410 shown in block form in FIG. 4.

Figure 7:
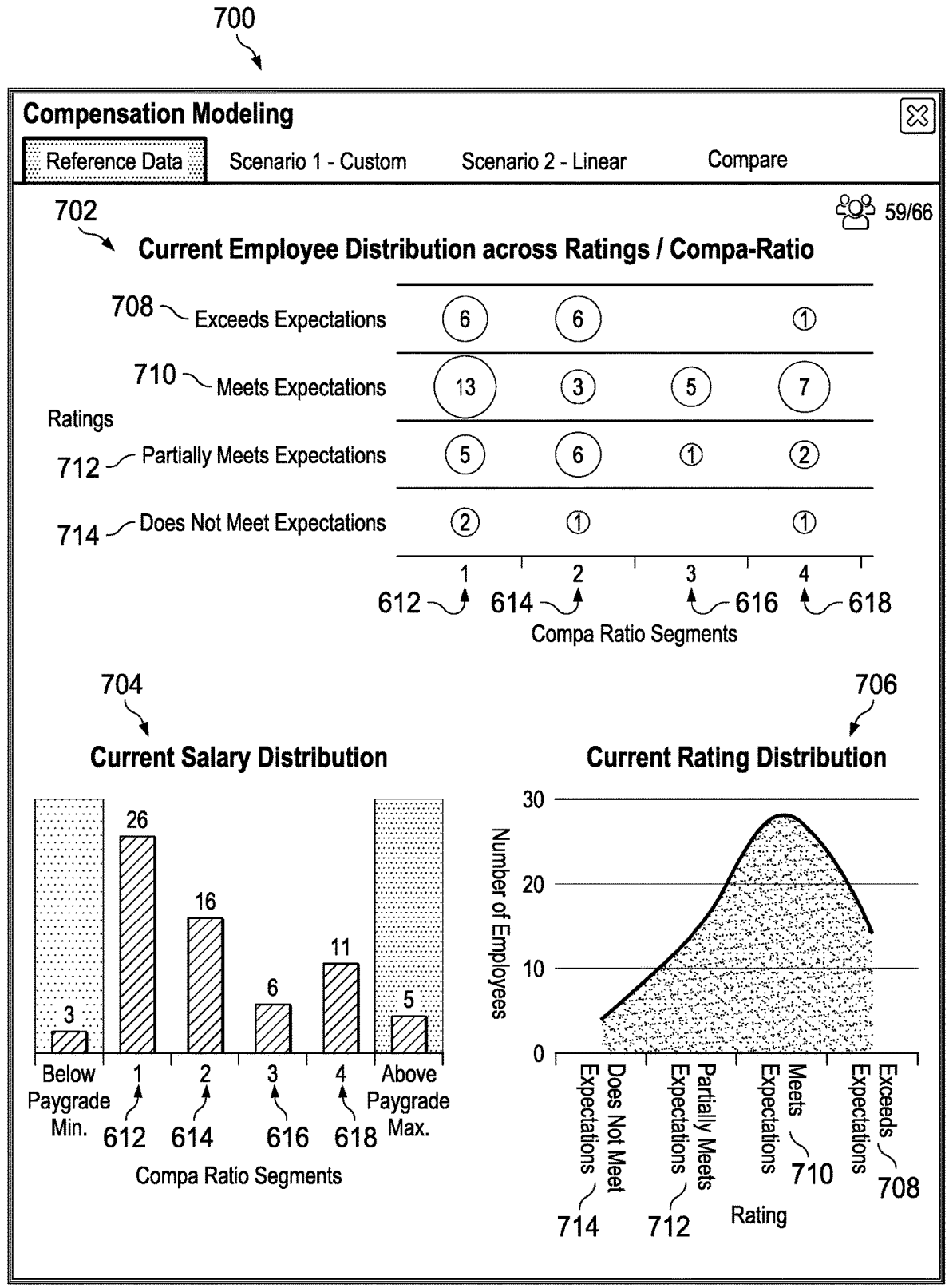
FIG. 7 is an illustration of a graphical user interface for displaying a compensation distribution, depicted in accordance with an illustrative embodiment.

With reference now to FIG. 7, the graphical user interface for displaying a compensation distribution is shown according to an illustrative embodiment. In this illustrative example, graphical user interface 700 is an example of a graphical user interface 152, shown in block form in FIG. 1.

In this illustrative example, graphical user interface 700 includes a number of different components. As depicted, graphical user interface 700 includes employee distribution 702, salary distribution 704, and rating distribution 706.

Employee distribution 702 is a data structure graphically illustrating group of employees 108 broken into merit groups 112, both shown in block form in FIG. 1. As depicted, employee distribution 702 includes merit group 708, merit group 710, merit group 712, and merit group 714. Employee distribution 702 further breaks each of merit groups 708, 710, 712, and 714, into group segments 612, 614, 616, and 618.

Salary distribution 704 is a data structure graphically illustrating group of employees 108 based on salary thresholds, such as compensation thresholds 302, shown in block form in FIG. 3. As depicted, salary distribution 704 illustrates group of employees 108 in one of group segment 612, 614, 616, or 618.

Rating distribution 706 is a data structure graphically illustrating group of employees 108 according to a plurality of merit groups, such as merit groups 112, shown in block form in FIG. 1. As depicted, rating distribution 706 shows group of employees 108 in one of merit groups 708, 710, 712, or 714.

Figure 8:
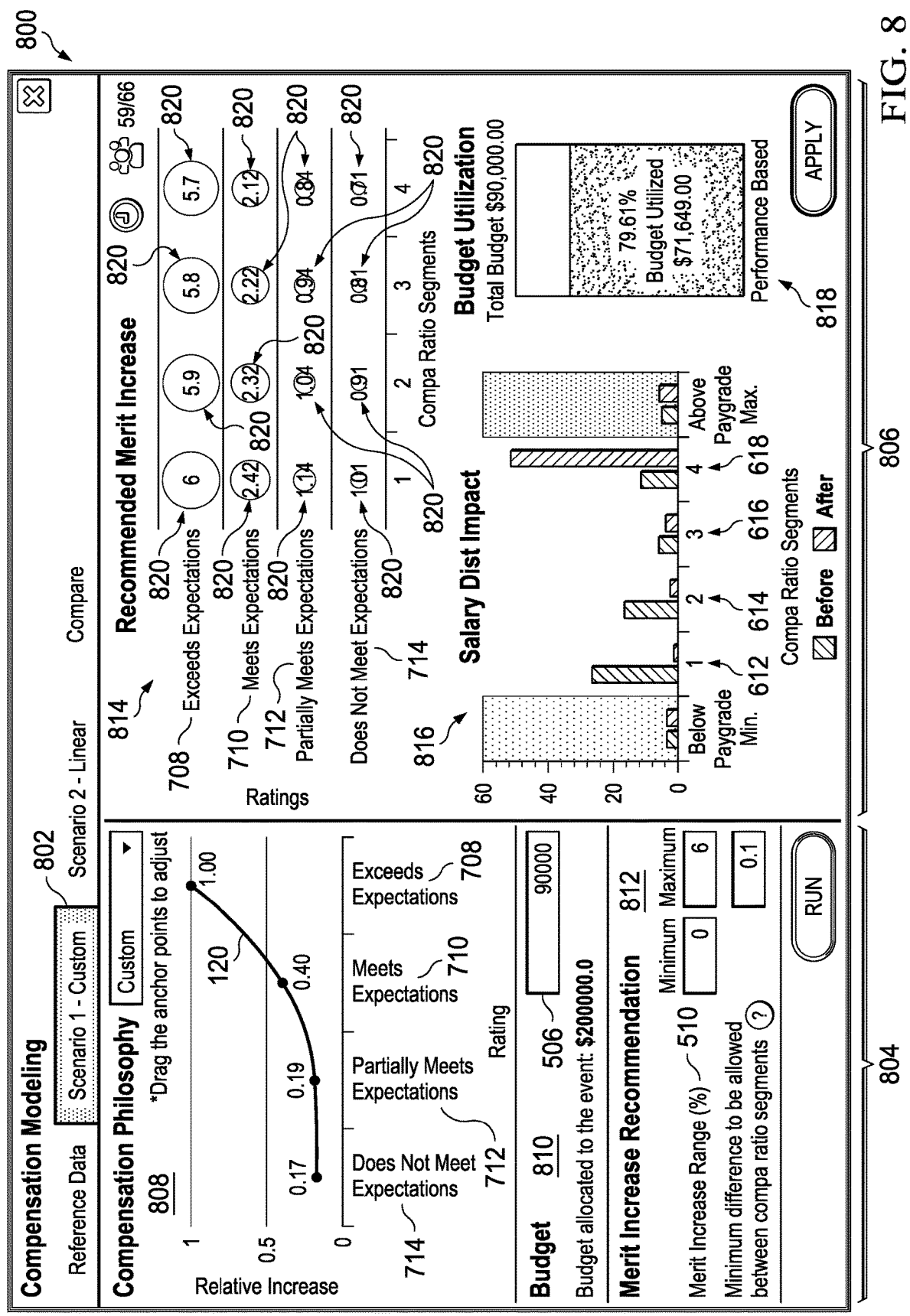
FIG. 8 is an illustration of a graphical user interface displaying a compensation adjustment scenario, depicted in accordance with an illustrative embodiment.

Turning now to FIG. 8, a graphical user interface displaying a compensation adjustment scenario is depicted according to an illustrative embodiment. As depicted, graphical user interface 800 is an example of a graphical user interface 152, shown in block form in FIG. 1. Compensation adjustment scenario 802 is an example of compensation adjustment scenario 124, shown in block form in FIG. 1.

As depicted, graphical user interface 800 includes a number of components. As depicted, graphical user interface 800 includes parameters 804 and impact 806.

As depicted, parameters 804 of graphical user interface 800 includes a number of components for interacting with compensation adjustment parameters 116, shown in block form in FIG. 1. As depicted, parameters 804 includes component 808, component 810, and component 812.

Component 808 allows for operator 150, shown in block form in FIG. 1, to adjust compensation adjustment parameters 116 related to allocation scheme 508, shown in block form in FIG. 5. In this illustrative example, component 808 includes at least one interactive component for adjusting distribution of compensation adjustment budget 506 among different ones of merit groups 708, 710, 712, and 714. As depicted, parameter 804 includes a drop-down menu for selecting among predefined application methodologies. Component 808 also includes an interactive graph through which operator 150 can individually set the relative compensation adjustment 120 applied to each of merit groups 708, 710, 712, and 714.

Component 810 allows an operator, such as operator 150 shown in block form in FIG. 1, to adjust compensation adjustment parameters 116 related to compensation adjustment budget 506, shown in block form in FIG. 5. In this illustrative example, component 810 includes at least one interactive component for adjusting compensation adjustment budget 506. As depicted, component 810 includes a line item entry for entering compensation adjustment budget 506.

Component 812 allows an operator, such as operator 150 shown in block form in FIG. 1, to adjust compensation adjustment parameters 116 related to compensation adjustment range 510, shown in block form in FIG. 5. In this illustrative example, component 812 includes at least one interactive component for adjusting compensation adjustment range 510. As depicted, range component 812 includes a line item entry for entering compensation adjustment range 510. Component 812 also includes a line item entry for entering a minimum difference in compensation adjustment 120 applied to each of merit groups 112.

In this illustrative example, graphical user interface 800 includes a number of components for displaying impact 806 of compensation adjustment parameters 116 selected parameters 804. As depicted, impact 806 includes component 814, component 816, and component 818.

Component 814 allows an operator, such as operator 150, shown in block form in FIG. 1, to graphically view impact 122 of compensation adjustment parameters 116 for each merit group according to an employee distribution, such as merit groups 708, 710, 712, and 714, and employee distribution 702, shown in block form in FIG. 7. As depicted, component 814 displayed impact 122 on employee distribution 702 as graphical analogues 820.

In this illustrative example, graphical analogues 820 are an example of graphical analogue 202, depicted in block form in FIG. 2. In this illustrative example, each of graphical analogues 820 visually indicates a relative value of compensation adjustment 120 as applied to a corresponding one of merit groups 708, 710, 712, and 714. As depicted, graphical analogues 820 visually indicate impact 122 of compensation adjustment parameters 116 for each merit group is a relatively sized circle. As depicted, a larger circle depicted by graphical analogues 820 indicates a relatively larger compensation adjustment 120 applied to a particular merit group. For example, merit group 708 is shown having a relatively larger graphical analogue 820, indicating a relatively larger compensation adjustment 120 applied to merit group 708. Conversely, merit group 710 is shown having a relatively smaller graphical analogue 820, indicating a relatively smaller compensation adjustment 120 applied to merit group 710.

Component 816 allows an operator, such as operator 150 shown in block form in FIG. 1, to graphically view impact 122 of compensation adjustment parameters 116 selected within parameters 804 on a salary distribution, such as salary distribution 704, shown in block form in FIG. 7.

Component 816 graphically illustrates group of employees 108 based on salary thresholds, such as compensation thresholds 302, shown in block form in FIG. 3. As depicted, component 816 graphically illustrates impact 122 of compensation adjustment parameters 116 selected within parameters 804 group for each of group segment 612, 614, 616, or 618. In this illustrative example, impact 122 as displayed in component 816 includes a comparison between a number of employees in each of group segment 612, 614, 616, or 618 both before and after applying compensation adjustment scenario 802.

Component 818 graphically illustrates a budget utilization of compensation adjustment scenario 802. In this illustrative example, component 818 indicates an amount of compensation adjustment budget 506, shown in block form in FIG. 5, as selected by component 810, that is currently allocated according to compensation adjustment scenario 802.

Figure 9:
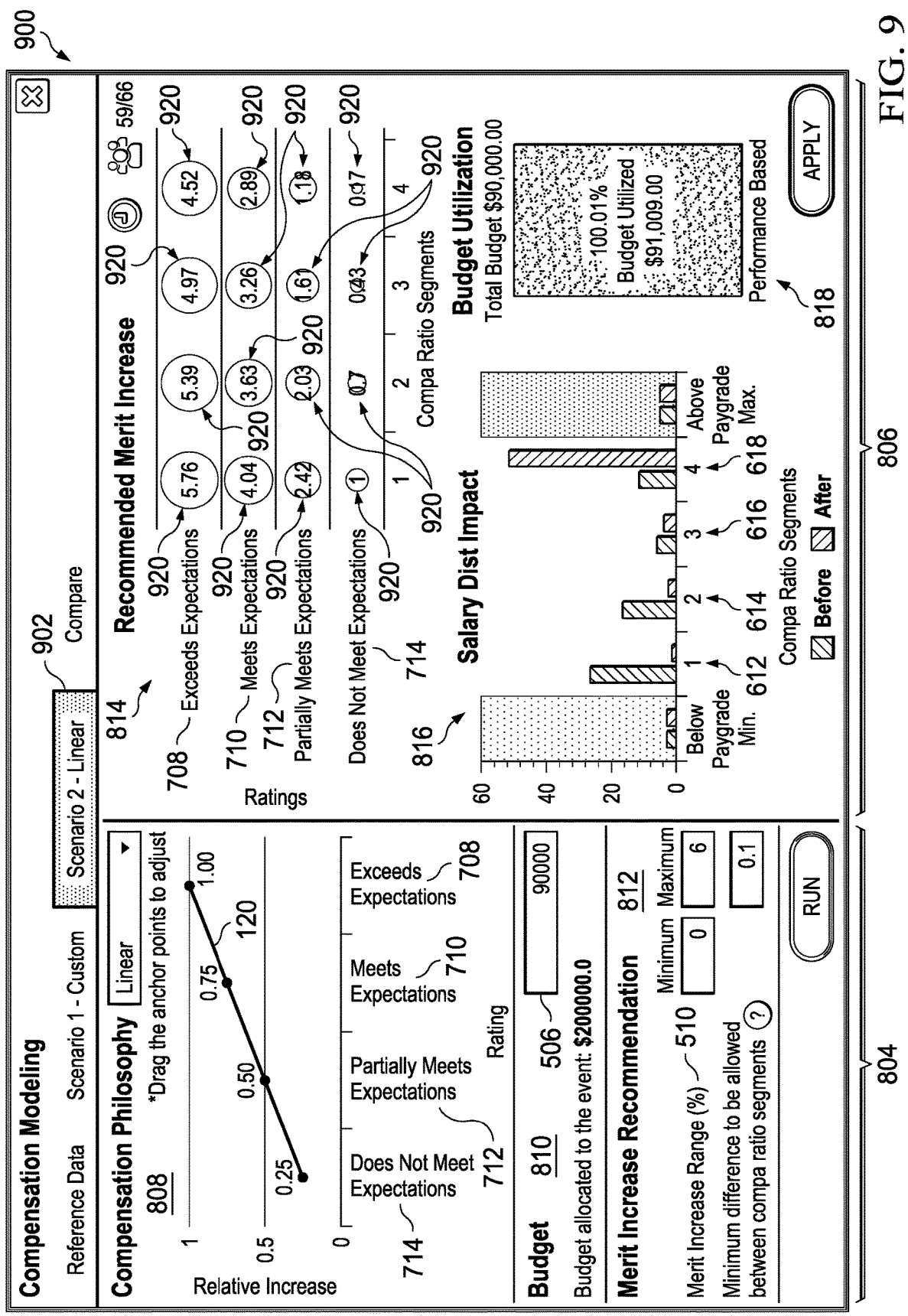
FIG. 9 is an illustration of a graphical user interface displaying a second compensation adjustment scenario, depicted in accordance with an illustrative embodiment.

Turning now to FIG. 9, a graphical user interface displaying a second compensation adjustment scenario is depicted according to an illustrative embodiment. As depicted, graphical user interface 900 is an example of a graphical user interface 152, shown in block form in FIG. 1. Compensation adjustment scenario 902 is an example of compensation adjustment scenario 124, shown in block form in FIG. 1.

In this illustrative example, a different allocation scheme, such as allocation scheme 508, shown in block form in FIG. 5, is indicated in component 808. Based on the allocation scheme selected in component 808, the impact of compensation adjustment scenario 902, as displayed in impact 806, is different from the impact of compensation adjustment scenario 802, as shown in FIG. 8.

In this illustrative example, impact 122 of compensation adjustment scenario 902 on employee distribution 702 is shown as graphical analogues 920 in component 814. As indicated in component 814, the specific compensation adjustment 120 applied to each merit group according to compensation adjustment scenario 902 is different from the compensation adjustment 120 applied to each merit group according to compensation adjustment scenario 802. Therefore, graphical analogues 920 are graphically indicated by component 814 as having relative sizes different than those of graphical analogues 820.

Additionally, impact 122 of compensation adjustment scenario 902 on salary distribution 704, shown in block form in FIG. 7, and compensation adjustment budget 506, shown in block form in FIG. 5, are graphically indicated in component 816 and component 818 respectively. Based on the allocation scheme selected in component 808, the impact of compensation adjustment scenario 902, as displayed in impact 806, is different from the impact of compensation adjustment scenario 802, as shown in FIG. 8. Therefore, compensation adjustment scenario 902 depicts a different impact on salary distribution, as indicated in component 816, and a different impact on budget utilization, as indicated in component 808, than compensation adjustment scenario 802 of FIG. 8.

Figure 10:
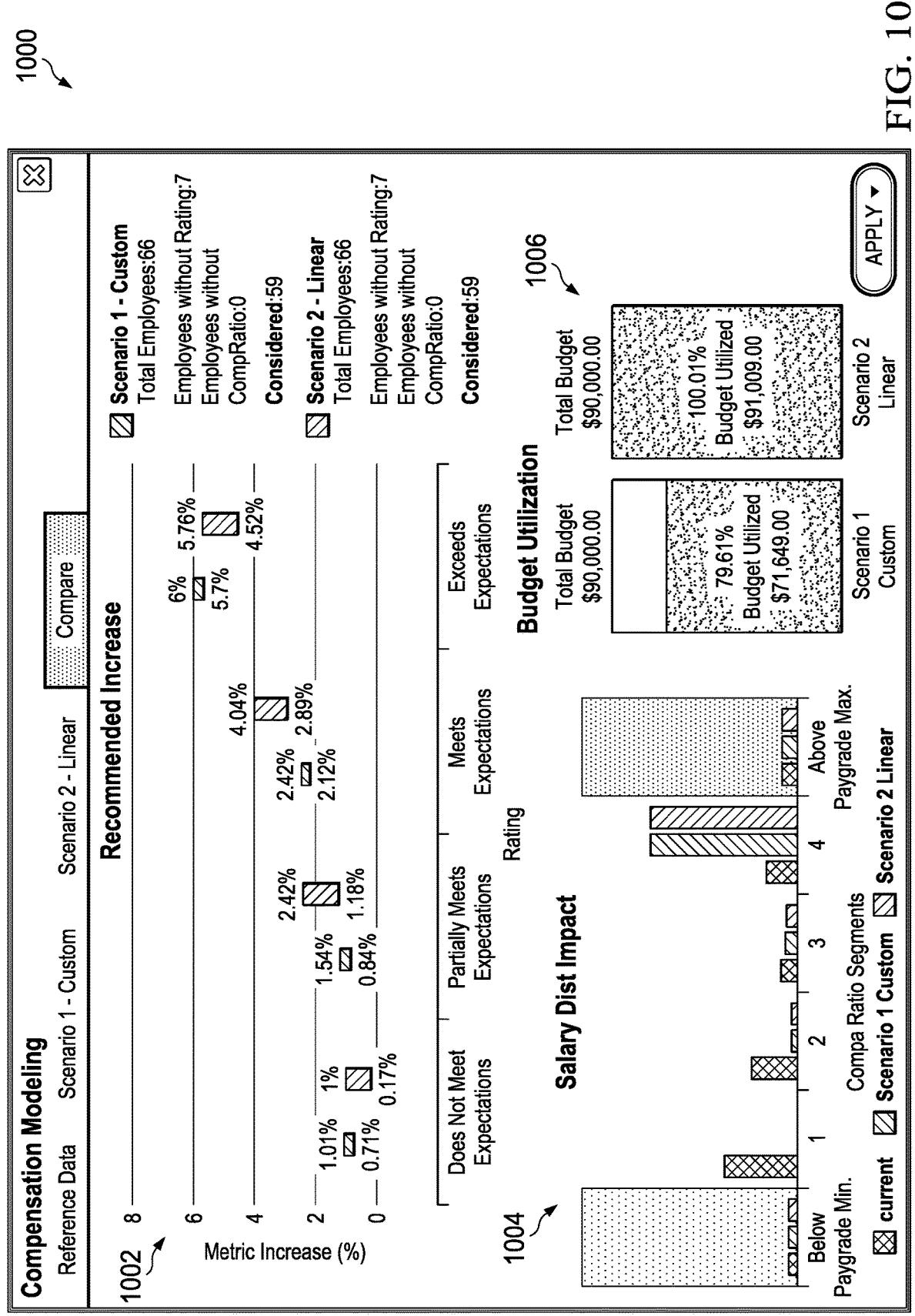
FIG. 10 is an illustration of a graphical user interface displaying a comparison between compensation adjustment scenarios, depicted in accordance with an illustrative embodiment.

Turning now to FIG. 10, a graphical user interface displaying a comparison between compensation adjustment scenarios is depicted according to an illustrative example. In this illustrative example, graphical user interface 1000 is an example of graphical user interface 152, shown in block form in FIG. 1.

As depicted, graphical user interface 1000 includes a number of components for comparing impact of different compensation adjustment scenarios, such as compensation adjustment scenario 124, shown in block form in FIG. 1. As depicted, graphical user interface 1000 compares compensation adjustment scenario 802 of FIG. 8 with compensation adjustment scenario 902 of FIG. 9. As depicted, graphical user interface 1000 includes component 1002, component 1004, and component 1006.

Component 1002 allows an operator, such as operator 150 shown in block form in FIG. 1, to graphically view a comparison between impact 122 on employee distribution according to compensation adjustment scenario 802, as indicated by component 808 of FIG. 8, with the employee distribution according to compensation adjustment scenario 902, as indicated by component 808 of FIG. 9. In this manner, the operator can easily determine differences in impact 122 on employee distribution between compensation adjustment scenario 802 and compensation adjustment scenario 902.

Component 1004 allows an operator, such as operator 150 shown in block form in FIG. 1, to graphically view a comparison between impact 122 and salary distribution according to compensation adjustment scenario 802 as indicated by component 810 of FIG. 8, with the salary distribution according to compensation adjustment scenario 902, as indicated by component 810 of FIG. 9. In this manner, the operator can easily determine differences in impact 122 on salary distribution between compensation adjustment scenario 802 and compensation adjustment scenario 902.

Component 1006 allows an operator, such as operator 150 shown in block form in FIG. 1, to graphically view a comparison between impact 122 on budget utilization according to compensation adjustment scenario 802 as indicated by component 812 of FIG. 8, with the salary distribution according to compensation adjustment scenario 902, as indicated by component 812 of FIG. 9. In this manner, the operator can easily determine differences in impact 122 on budget utilization between compensation adjustment scenario 802 and compensation adjustment scenario 902.

Figure 11:
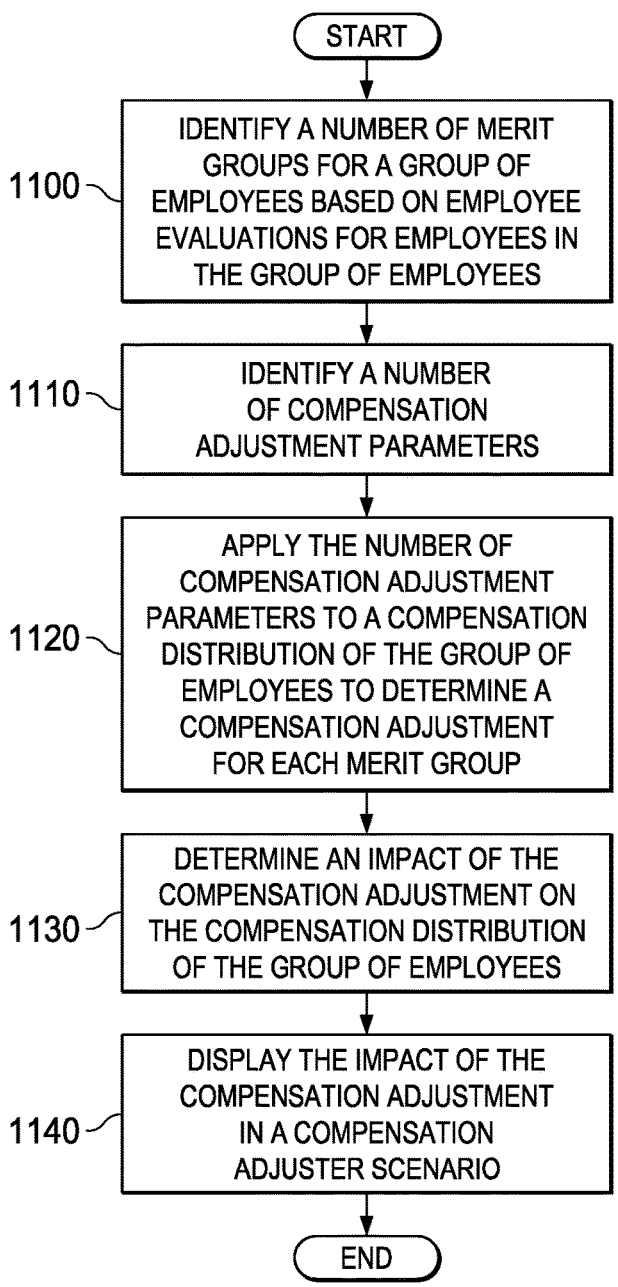
FIG. 11 is an illustration of a flowchart of a process for visualizing compensation adjustments for employees of an organization, depicted in accordance with an illustrative embodiment.

With reference now to FIG. 11, a flowchart of a process for visualizing compensation adjustments for employees of an organization is depicted in accordance with an illustrative embodiment. The process depicted in this flowchart may be implemented in compensation modeler 142, shown in block form in FIG. 1.

The process begins by identifying a number of merit groups for a group of employees based on employee evaluation for employees in the group of employees (step 1100). The merit groups can be merit groups such as merit groups 112, shown in block form in FIG. 1.

The process then identifies a number of compensation adjustment parameters (step 1110). The compensation adjustment parameters can be, for example, compensation adjustment parameters 116 shown in block form in FIG. 1.

The process then applies the number of compensation adjustment parameters to a compensation distribution of the group of employees to determine a compensation adjustment for each merit group (step 1120). The compensation distribution can be, for example compensation distribution 118, shown in block form in FIG. 1. The compensation adjustment can be for example, compensation adjustment 120, shown in block form in FIG. 1.

The process then determines impact of the compensation adjustment on the compensation distribution of the group of employees (step 1130). The impact can be, for example impact 122, shown in block form in FIG. 1. The impact can include an impact on employee distribution, such as employee distribution 702 of FIG. 7, an impact on salary distribution, such as salary distribution 704 of FIG. 7, and an impact on budget utilization, such as illustrated in component 818 of FIG. 8.

The process displays the impact of the compensation adjustment in a compensation adjustment scenario (step 1140), with the process terminating thereafter. The compensation adjustment scenario can be, for example, compensation adjustment scenario 124 shown in block form in FIG. 1. In this manner, the process illustrated in FIG. 11 may be used to display information 134, including impact 122 of compensation adjustment 120 on compensation distribution 118, enabling more efficient performance of operation 146, selected from at least one of hiring, benefits administration, payroll, performance reviews, forming teams for new products, assigning research projects, or other suitable operations for organization 110.

Figure 12:
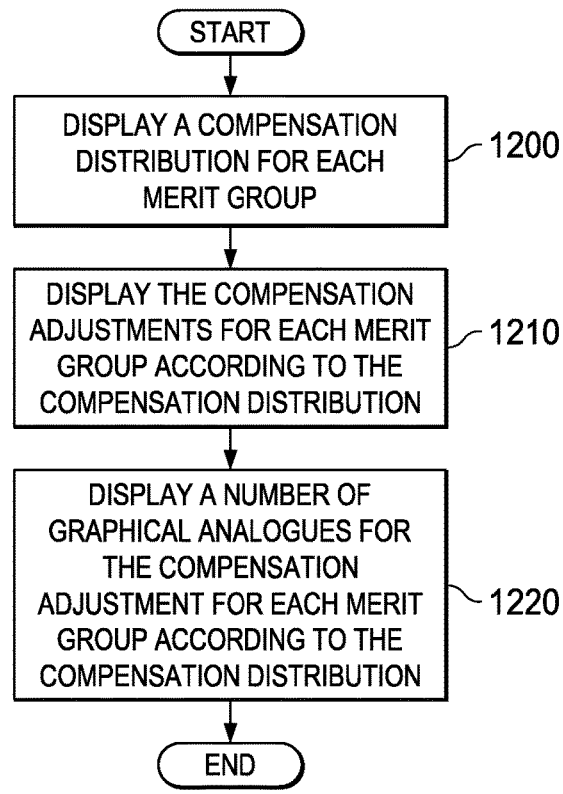
FIG. 12 is an illustration of a flowchart of a process for displaying the impact of the compensation adjustment any compensation adjustment scenario, depicted in accordance with an illustrative embodiment.

Turning now to FIG. 12, a flowchart of a process for displaying the impact of the compensation adjustment any compensation adjustment scenario is depicted in accordance with an illustrative embodiment. The process of FIG. 12 is a more detailed flowchart of a process step 1140 of FIG. 11.

The process of FIG. 12 displays a compensation distribution for each merit group (step 1200). The process of FIG. 12 can display the compensation distribution for each merit group in an employee distribution, such as employee distribution 702 of FIG. 7.

The process then displays the compensation adjustments for each merit group according to the compensation distribution (step 1210). The compensation adjustments for each merit group can be displayed in a component of the compensation adjustment scenario, such as component 814 of compensation adjustment scenario 802, shown in FIG. 8.

The process displays a number of graphical analogues for the compensation adjustment for each merit group according to the compensation distribution (step 1220). The graphical analogues can be, for example a graphical analogue 202, shown in block form in FIG. 2. The graphical analogues can be, for example, graphical analogues 820 of compensation adjustment scenario 802, shown in FIG. 8.

In this manner, the process illustrated in FIG. 12 enables display of impact 122 of compensation adjustment 120 across compensation distribution 118 for merit group 144 relative to other merit groups 112 according to compensation adjustment parameters 116 as defined by policy 148, both shown in block form in FIG. 1.

Operator 150, shown in block form in FIG. 1, may interact with compensation adjustment scenario 124 through graphical user interface 152 displayed on display system 158 to access impact 122 of compensation adjustment 120 on compensation distribution 118. The process of FIG. 12 presents compensation adjustment scenario 124 within a graphical user interface 152 such that information, such as impact 122 of compensation adjustment 120 can be efficiently and easily utilized when performing operations for organization 110, shown in block form in FIG. 1.

Figure 13:
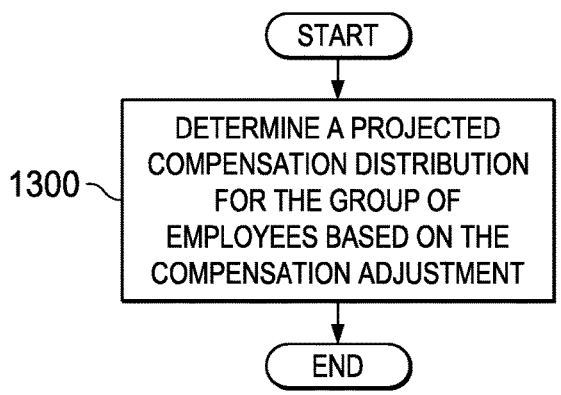
FIG. 13 is an illustration of a process for determining the impact of the compensation adjustment on the compensation distribution of the group of employees, depicted in accordance with an illustrative embodiment.

With reference now to FIG. 13, a process for determining the impact of the compensation adjustment on the compensation distribution of the group of employees is shown according to an illustrative embodiment. The process of FIG. 13 is a more detailed depiction of process step 1130 of FIG. 11.

The process of FIG. 13 determines a projected compensation distribution for the group of employees based on the compensation adjustment (step 1300). The compensation distribution can be, for example, compensation distribution 118 shown in block form in FIG. 1. The group of employees can be, for example, group of employees 108 shown in block form in FIG. 1.

Figure 14:
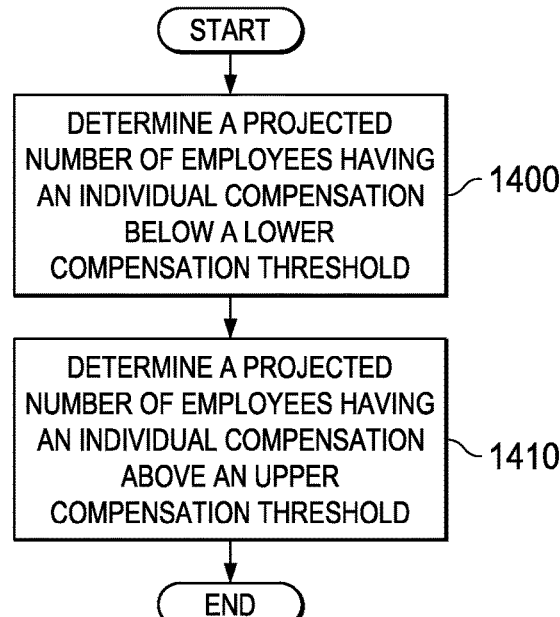
FIG. 14 is an illustration of a process for determining a projected compensation distribution for the group of employees based on the compensation adjustment, depicted in accordance with an illustrative embodiment.

With reference now to FIG. 14, a process for determining a projected compensation distribution for the group of employees based on the compensation adjustment is depicted according with an illustrative embodiment. The process of FIG. 14 is a more detailed depiction of process step 1300 of FIG. 13.

The process determines a projected number of employees having an individual compensation below a lower compensation threshold (1400). The projected number of employees can be, for example, projected number 306, shown in block form in FIG. 3. The individual compensation can be, for example, individual compensation 406, shown in block form in FIG. 4. The lower compensation threshold can be, for example, lower threshold 308, shown in block form in FIG. 3.

The process determines a projected number of employees having an individual compensation above and upper compensation threshold (1400). T the projected number of employees can be, for example, projected number 306, shown in block form in FIG. 3. The individual compensation can be, for example, individual compensation 406, shown in block form in FIG. 4. The upper compensation threshold can be, for example, upper threshold 300 and, shown in block form in FIG. 3.

In this manner, the processes illustrated in FIGS. 13 and 14 enable display of projected compensation distribution 304, including projected number 306 of group of employees 108 having an adjusted compensation 312 outside of compensation thresholds 302 after application of compensation adjustment 120 according to compensation adjustment parameters 116 as defined by policy 148.

Operator 150, shown in block form in FIG. 1, may interact with compensation adjustment scenario 124 through graphical user interface 152 displayed on display system 158 to access impact 122 of compensation adjustment 120 on compensation distribution 118. The processes of FIGS. 13 and 14 present compensation adjustment scenario 124 within a graphical user interface 152 such that impact 122 of compensation adjustment 120, including projected compensation distribution 304 and projected number 306, can be efficiently and easily utilized when performing operations for organization 110, shown in block form in FIG. 1.

Figure 15:
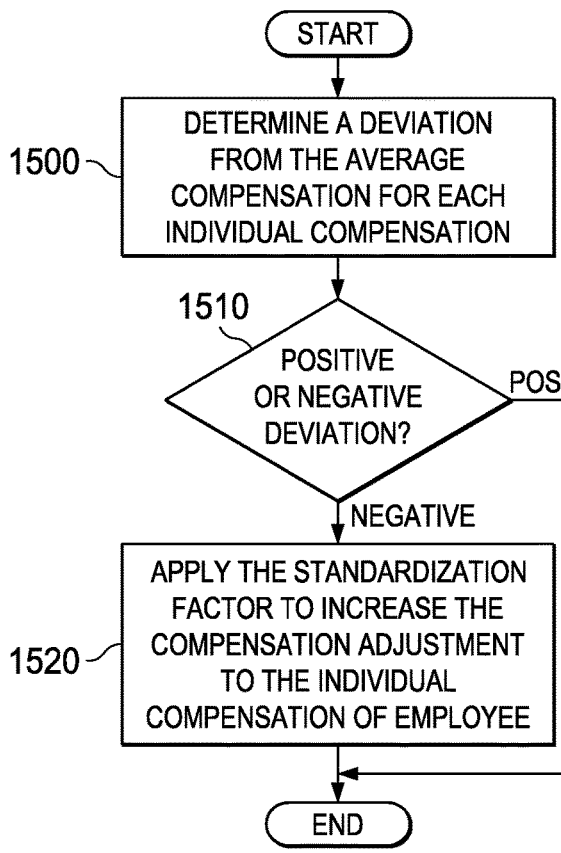
FIG. 15 is an illustration of a flowchart of a method for applying the number of compensation adjustment parameters to the compensation distribution of a group of employees, depicted in accordance with an illustrative embodiment.

With reference now to FIG. 15, a flowchart of a method for applying the number of compensation adjustment parameters to the compensation distribution of a group of employees is depicted in accordance with an illustrative embodiment. The process of FIG. 15 is a more detailed description of process step 1120 of FIG. 11.

The process determines a deviation from an average compensation for each individual compensation (step 1500). The Asian can be, for example, deviation 408 shown in block form in FIG. 4. The individual compensation can be, for example, individual compensation 406, shown in block form in FIG. 4.

The process then determines whether the deviation is a positive or negative deviation (step 1510). A positive deviation can be, for example positive deviation 400 and shown in block form in FIG. 4. A negative deviation can be, for example, negative deviation 412 shown in block form in FIG. 4.

Responsive to determining that the deviation is a negative deviation ("negative" at step 1510), the process applies a standardization factor to increase the compensation adjustment to the individual compensation of the employee (step 1520). The standardization factor can be, for example, standardization factor 402 shown in block form in FIG. 4.

Responsive to determining that the deviation is a positive deviation ("positive" at step 1510), the process applies the standardization factor to decrease the compensation adjustment to the individual compensation of the employee (step 1530).

In this manner, the process of FIG. 15 enables display of projected compensation distribution 304, including projected number 306 of group of employees 108 having an adjusted compensation 312 outside of compensation thresholds 302 after application of compensation adjustment 120 according to compensation adjustment parameters 116 as defined by policy 148.

Operator 150, shown in block form in FIG. 1, may interact with compensation adjustment scenario 124 through graphical user interface 152 displayed on display system 158 to access impact 122 of compensation adjustment 120 on compensation distribution 118. The process of FIG. 15 presents compensation adjustment scenario 124 within a graphical user interface 152 such that impact 122 of compensation adjustment 120, including projected compensation distribution 304 and projected number 306, can be efficiently and easily utilized when performing operations for organization 110, shown in block form in FIG. 1.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
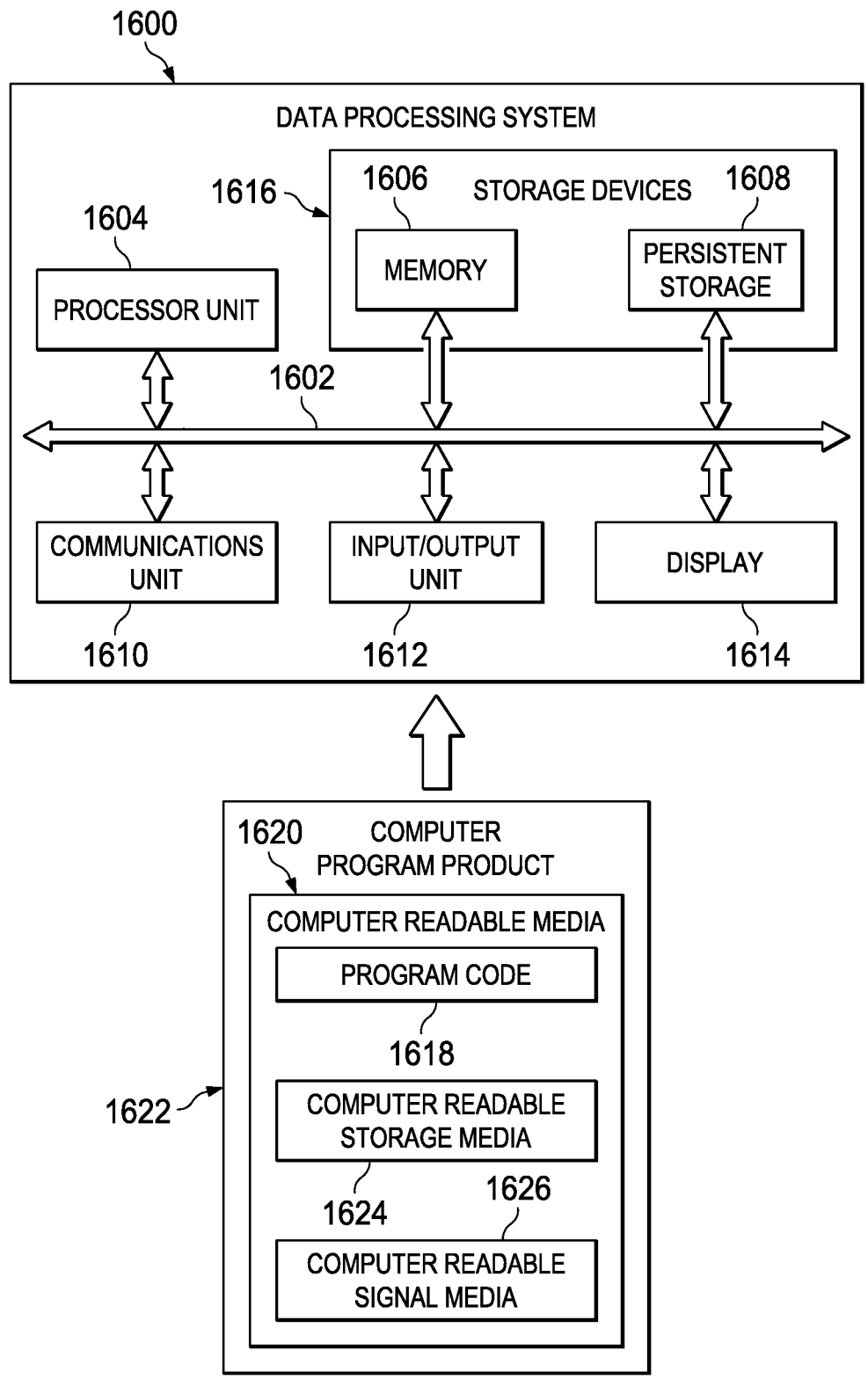
FIG. 16 is an illustration of a block diagram of a data processing system, depicted in accordance with an illustrative embodiment.

Turning now to FIG. 16, a block diagram of a data processing system is depicted in accordance with an illustrative embodiment. Data processing system 1600 may be used to implement computer system 132 shown in block form in FIG. 1. In this illustrative example, data processing system 1600 includes communications framework 1602, which provides communications between processor unit 1604, memory 1606, persistent storage 1608, communications unit 1610, input/output unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or on both a temporary basis and a permanent basis. Storage devices 1616 may also be referred to as computer readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a solid state hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these illustrative examples. In one example, computer readable media 1620 may be computer readable storage media 1624 or computer readable signal media 1626. In these illustrative examples, computer readable storage media 1624 is a physical or tangible storage device used to store program code 1618 rather than a medium that propagates or transmits program code 1618.

Alternatively, program code 1618 may be transferred to data processing system 1600 using computer readable signal media 1626. Computer readable signal media 1626 may be, for example, a propagated data signal containing program code 1618. For example, computer readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

Thus, the illustrative embodiments provide a method and apparatus for visualizing compensation adjustments for employees of an organization. In one illustrative example, a method for visualizing compensation adjustments for employees of organization is presented. A computer system identifies a number of merit groups for a group of employees based on employee evaluation for employees in the group of employees. The computer system identifies a number of compensation adjustment parameters. The computer system applies the number of compensation adjustment parameters to a compensation distribution of the group of employees to determine a compensation adjustment for each merit group. The computer system determines impact of the compensation adjustment on the compensation distribution of the group of employees. The computer system displays the impact of the compensation adjustment in a compensation adjustment scenario.

In this manner, the use of compensation modeler 142 has a technical effect of reducing time, effort, or both in generating compensation adjustment scenario 124 for displaying impact 122 of compensation adjustment 120 on display system 158. In this manner, operation 146 performed for organization 110 may be performed more efficiently as compared to currently used systems. For example, compensation adjustment scenario 124 may be used to display information 134, including impact 122 of compensation adjustment 120 on compensation distribution 118, enabling more efficient performance of operation 146, selected from at least one of hiring, benefits administration, payroll, performance reviews, forming teams for new products, assigning research projects, or other suitable operations for organization 110.

As a result, computer system 132 operates as a special purpose computer system in which compensation modeler 142 in computer system 132 enables modeling the impact 122 of compensation adjustment 120 among merit groups 112 in a manner that is consistent with compensation adjustment parameters 116 for display in graphical user interface 152 of display system 158. For example, compensation modeler 142 applies compensation adjustment parameters 116 to employee information 136 based on merit groups 112 such that impact 122 is determined according to selected compensation adjustment parameters 116 as defined by policy 148. For example, compensation adjustment 120 is applied to compensation distribution 118 to form compensation adjustment scenario 124 only when impact 122 of compensation adjustment 120 meets one or more rules in policy 148 defining compensation adjustment parameters 116.

Thus, compensation modeler 142 transforms computer system 132 into a special purpose computer system as compared to currently available general computer systems that do not have compensation modeler 142. Currently used general computer systems do not reduce the time or effort needed to generate compensation adjustment scenario 124 for displaying impact 122 of compensation adjustment 120 on display system 158. Further, currently used general computer systems do not apply compensation adjustment 120 to compensation distribution 118 to form compensation adjustment scenario 124 only when impact 122 of compensation adjustment 120 meets one or more rules in policy 148 defining compensation adjustment parameters 116.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system to predict an impact of an adjustment, comprising:
   one or more processors, coupled with memory, to:
   receive, from a client device, evaluation information for a set of members, the evaluation information related to a performance of each member of the set of members;
   determine, using the evaluation information, a quantized ranking of each member of the set of members according to the performance of each member of the set of members;
   generate, in the memory, a structure mapping relationships between each member of the set of members using the quantized ranking and compensation information of the set of members;
   identify, using the structure generated in the memory, a subset of the set of members corresponding to the quantized ranking of each member of the set of members;
   cause a graphical user interface of the client device to render a first display of a plurality of adjustment parameters and a corresponding plurality of interactive elements for selection of the plurality of adjustment parameters interactable via the client device;
   receive, from the client device responsive to an interaction with one of the plurality of interactive elements, a selection of an adjustment parameter of the plurality of adjustment parameters for the subset, wherein the adjustment parameter comprises a standardization factor and is associated with at least one adjustment policy indicative of at least one of a total value allocated for compensation adjustment, a distribution methodology of the total value for at least the subset, or an adjustment range for at least one member of the set of members;
   determine, responsive to receiving the selection of the adjustment parameter, a deviation between the compensation information of each member of the set of members and a mean compensation determined from the compensation information of the set of members;
   determine, responsive to the determination of the deviation, an adjustment to the subset by applying the standardization factor of the adjustment parameter to the compensation information of each member of the set of members according to the deviation, wherein the standardization factor is indicative of an increase or a decrease of the adjustment to the compensation information according to the deviation;
   update, responsive to the determination of the adjustment, the compensation information associated with the set of members based on the adjustment, the structure, and the adjustment parameter;
   cause the graphical user interface of the client device to render a second display of the updated compensation information in response to updating the compensation information;
   determine, responsive to updating the compensation information using at least the received adjustment parameter selected via the graphical user interface, a first impact on the deviation between the compensation information of each member of the set of members and the mean compensation according to the adjustment parameter of the updated compensation information on the set of members, the first impact indicative of a first change to the deviation according to the updated compensation information using the adjustment parameter;
   cause, responsive to determining the first impact based on the selection of the adjustment parameter, the graphical user interface of the client device to render a third display comprising a first value representing the adjustment associated with the adjustment parameter and a first visual indication of the first impact indicative of the first change;
   determine, responsive to updating the compensation information using at least a second adjustment parameter that is selected responsive to an interaction with another one of the plurality of interactive elements, a second impact on the deviation between the compensation information of each member of the set of members and the mean compensation according to the second adjustment parameter of the updated compensation information on the set of members, the second impact indicative of a second change to the deviation according to the updated compensation information using the second adjustment parameter, wherein the second adjustment parameter is selected from the plurality of adjustment parameters;
   cause, responsive to determining the second impact based on the selection of the second adjustment parameter, the graphical user interface of the client device to render a fourth display comprising a second value representing an adjustment associated with the second adjustment parameter and a second visual indication of the second impact indicative of the second change;
   cause, responsive to determining the first impact and the second impact based on selecting the adjustment parameter and the second adjustment parameter of the plurality of adjustment parameters, respectively, the graphical user interface of the client device to render a fifth display comprising a comparison between the first impact associated with the adjustment parameter to the second impact associated with the second adjustment parameter; and
   perform an operation, responsive to rendering and receiving interactions via at least one of the third display, the fourth display, or the fifth display, the operation corresponding to the set of members based on at least one of the first impact or the second impact on the deviation satisfying at least one rule associated with the adjustment parameter or the second adjustment parameter.

2. The system of claim 1, comprising the one or more processors to:
determine, responsive to the determination of the deviation, that the deviation corresponding to the at least one member of the set of members is greater than a threshold; and
determine the adjustment for the at least one member of the set of members to minimize the deviation of the at least one member.

3. The system of claim 1, comprising the one or more processors to:
determine the deviation between the compensation information of each member of the set of members and the mean compensation determined from the compensation information of the set of members indicating the compensation information of one or more members of the set of members is greater than the mean compensation; and
determine the adjustment for the one or more members of the set of members to increase compensation at a rate less than the set of members excluding the one or more members.

4. The system of claim 1, wherein the operation is at least one of applying the adjustment to the subset, a hiring operation, benefits administration operation, payroll operation, performance review operation, team forming operation, or research assigning operation.

5. The system of claim 1, comprising the one or more processors to:
determine, for a member of the subset with a deviation indicating the compensation information of the member of the subset is less than the mean compensation, a second adjustment greater than the adjustment; and
update the compensation information of the member of the subset based on the second adjustment.

6. The system of claim 1, comprising the one or more processors to:
determine, for a member of the subset with a deviation indicating the compensation information of the member of the subset is greater than the mean compensation, a second adjustment less than the adjustment; and
update the compensation information of the member of the subset based on the second adjustment.

7. The system of claim 1, comprising the one or more processors to:
receive, from the client device, the second adjustment parameter for the set of members;
determine a second adjustment to the subset using the deviation, the second adjustment parameter, and the compensation information;
update the compensation information associated with the set of members based on the second adjustment, the structure, and the second adjustment parameter; and
determine the second impact comprising a distribution of the compensation information, the set of members, and the second adjustment parameter of the updated compensation information on the set of members.

8. The system of claim 1, comprising the one or more processors to display, via the graphical user interface of the client device, the comparison of the first impact to the second impact, the first impact, and the second impact.

9. The system of claim 1, wherein the comparison of the first impact to the second impact comprises a comparison of the compensation information.

10. The system of claim 1, wherein the adjustment parameter comprises a threshold adjustment.

11. A method to predict an impact of an adjustment, comprising:
receiving, by one or more processors, coupled with memory, from a client device, evaluation information for a set of members, the evaluation information related to a performance of each member of the set of members;
determining, by the one or more processors, using the evaluation information, a quantized ranking of each member of the set of members according to the performance of each member of the set of members;
generating, by the one or more processors, in the memory, a structure mapping relationships between each member of the set of members using the quantized ranking and compensation information of the set of members;
identifying, by the one or more processors using the structure generated in the memory, a subset of the set of members corresponding to the quantized ranking of each member of the set of members;
causing, by the one or more processors, a graphical user interface of the client device to render a first display of a plurality of adjustment parameters and a corresponding plurality of interactive elements for selection of the plurality of adjustment parameters interactable via the client device;
receiving, by the one or more processors, responsive to an interaction with one of the plurality of interactive elements, from the client device, a selection of an adjustment parameter of the plurality of adjustment parameters for the subset, wherein the adjustment parameter comprises a standardization factor and is associated with at least one adjustment policy indicative of at least one of a total value allocated for compensation adjustment, a distribution methodology of the total value for at least the subset, or an adjustment range for at least one member of the set of members;
determining, by the one or more processors, responsive to receiving the selection of the adjustment parameter, a deviation between the compensation information of each member of the set of members and a mean compensation determined from the compensation information of the set of members;
determining, by the one or more processors, responsive to the determination of the deviation, an adjustment to the subset by applying the standardization factor of the adjustment parameter to the compensation information of each member of the set of members according to the deviation, wherein the standardization factor is indicative of an increase or a decrease of the adjustment to the compensation information according to the deviation;
updating, by the one or more processors responsive to the determination of the adjustment, the compensation information associated with the set of members based on the adjustment, the structure, and the adjustment parameter;
causing, by the one or more processors, the graphical user interface of the client device to render a second display of the updated compensation information in response to updating the compensation information;
determining, by the one or more processors, responsive to updating the compensation information using at least the received adjustment parameter selected via the graphical user interface, a first impact on the deviation between the compensation information of each member of the set of members and the mean compensation according to the adjustment parameter of the updated compensation information on the set of members, the first impact indicative of a first change to the deviation according to the updated compensation information using the adjustment parameter;

causing, by the one or more processors, responsive to determining the first impact based on the selection of the adjustment parameter, the graphical user interface of the client device to render a third display comprising a first value representing the adjustment associated with the adjustment parameter and a first visual indication of the first impact indicative of the first change;

determining, by the one or more processors, responsive to updating the compensation information using at least a second adjustment parameter that is selected responsive to an interaction with another one of the plurality of interactive elements, a second impact on the deviation between the compensation information of each member of the set of members and the mean compensation according to the second adjustment parameter of the updated compensation information on the set of members, the second impact indicative of a second change to the deviation according to the updated compensation information using the second adjustment parameter, wherein the second adjustment parameter is selected from the plurality of adjustment parameters;

causing, by the one or more processors, responsive to determining the second impact based on the selection of the second adjustment parameter, the graphical user interface of the client device to render a fourth display comprising a second value representing an adjustment associated with the second adjustment parameter and a second visual indication of the second impact indicative of the second change;

causing, by the one or more processors, responsive to determining the first impact and the second impact based on selecting the adjustment parameter and the second adjustment parameter of the plurality of adjustment parameters, respectively, the graphical user interface of the client device to render a fifth display comprising a comparison between the first impact associated with the adjustment parameter to the second impact associated with the second adjustment parameter; and performing, by the one or more processors, an operation, responsive to rendering and receiving interactions via at least one of the third display, the fourth display, or the fifth display, the operation corresponding to the set of members according to whether the first impact or the second impact on the deviation satisfying at least one rule associated with the adjustment parameter or the second adjustment parameter.

12. The method of claim 11, comprising:
determining, by the one or more processors responsive to the determination of the deviation, that the deviation corresponding to the at least one member of the set of members is greater than a threshold; and
determining, by the one or more processors, the adjustment for the at least one member of the set of members to minimize the deviation of the at least one member.

13. The method of claim 11, comprising:
determining, by the one or more processors, the deviation between the compensation information of each member of the set of members and the mean compensation determined from the compensation information of the set of members indicates that the compensation information of one or more members of the set of members is greater than the mean compensation; and
determining, by the one or more processors, the adjustment for the one or more members of the set of members to increase compensation at a rate less than the set of members excluding the one or more members.

14. The method of claim 11, wherein the operation is at least one of applying the adjustment to the subset, a hiring operation, benefits administration operation, payroll operation, performance review operation, team forming operation, or research assigning operation.

15. The method of claim 11, comprising:
receiving, by the one or more processors, from the client device, the second adjustment parameter for the set of members;
determining, by the one or more processors, a second adjustment to the subset using the deviation, the second adjustment parameter, and the compensation information;
updating, by the one or more processors, the compensation information associated with the set of members based on the second adjustment, the structure, and the second adjustment parameter; and
determining, by the one or more processors, the second impact comprising a distribution of the compensation information, the set of members, and the second adjustment parameter of the updated compensation information on the set of members.

16. The method of claim 11, comprising displaying, by the one or more processors, via the graphical user interface of the client device, the comparison of the first impact to the second impact, the first impact, and the second impact.

17. The method of claim 11, wherein the comparison of the first impact to the second impact comprises a comparison of the compensation information.

18. The method of claim 11, wherein the adjustment parameter comprises a threshold adjustment.

19. A non-transitory computer-readable medium storing processor executable instructions that, when executed by one or more processors, cause the one or more processors to:
receive, from a client device, evaluation information for a set of members, the evaluation information related to a performance of each member of the set of members;
determine, using the evaluation information, a quantized ranking of each member of the set of members according to the performance of each member of the set of members;
generate, in memory, a structure mapping relationships between each member of the set of members using the quantized ranking and compensation information of the set of members;
identify, using the structure generated in the memory, a subset of the set of members corresponding to the quantized ranking of each member of the set of members;
cause a graphical user interface of the client device to render a first display of a plurality of adjustment parameters and a corresponding plurality of interactive elements for selection of the plurality of adjustment parameters interactable via the client device;
receive, from the client device responsive to an interaction with one of the plurality of interactive elements, a selection of an adjustment parameter of the plurality of adjustment parameters for the subset, wherein the adjustment parameter comprises a standardization factor and is associated with at least one adjustment policy indicative of at least one of a total value allocated for compensation adjustment, a distribution methodology of the total value for at least the subset, or an adjustment range for at least one member of the set of members;

determine, responsive to receiving the selection of the adjustment parameter, a deviation between the compensation information of each member of the set of members and a mean compensation determined from the compensation information of the set of members;

determine, responsive to the determination of the deviation, an adjustment to the subset by applying the standardization factor of the adjustment parameter to the compensation information of each member of the set of members according to the deviation, wherein the standardization factor is indicative of an increase or a decrease of the adjustment to the compensation information according to the deviation;

update, responsive to the determination of the adjustment, the compensation information associated with the set of members based on the adjustment, the structure, and the adjustment parameter;

cause the graphical user interface of the client device to render a second display of the updated compensation information in response to updating the compensation information;

determine, responsive to updating the compensation information using at least the received adjustment parameter selected via the graphical user interface, a first impact on the deviation between the compensation information of each member of the set of members and the mean compensation according to the adjustment parameter of the updated compensation information on the set of members, the first impact indicative of a first change to the deviation according to the updated compensation information using the adjustment parameter;

cause, responsive to determining the first impact based on the selection of the adjustment parameter, the graphical user interface of the client device to render a third display comprising a first value representing the adjustment associated with the adjustment parameter and a first visual indication of the first impact indicative of the first change;

determine, responsive to updating the compensation information using at least a second adjustment parameter that is selected responsive to an interaction with another one of the plurality of interactive elements, a second impact on the deviation between the compensation information of each member of the set of members and the mean compensation according to the second adjustment parameter of the updated compensation information on the set of members, the second impact indicative of a second change to the deviation according to the updated compensation information using the second adjustment parameter, wherein the second adjustment parameter is selected from the plurality of adjustment parameters;

cause, responsive to determining the second impact based on the selection of the second adjustment parameter, the graphical user interface of the client device to render a fourth display comprising a second value representing an adjustment associated with the second adjustment parameter and a second visual indication of the second impact indicative of the second change;

cause, responsive to determining the first impact and the second impact based on selecting the adjustment parameter and the second adjustment parameter of the plurality of adjustment parameters, respectively, the graphical user interface of the client device to render a fifth display comprising a comparison between the first impact associated with the adjustment parameter to the second impact associated with the second adjustment parameter; and perform an operation, responsive to rendering and receiving interactions via at least one of the third display, the fourth display, or the fifth display, the operation corresponding to the set of members based on at least one of the first impact or the second impact on the deviation satisfying at least one rule associated with the adjustment parameter or the second adjustment parameter.

20. The non-transitory computer-readable medium of claim 19, comprising the instructions to cause the one or more processors to:

determine, responsive to the determination of the deviation, that the deviation corresponding to the at least one member of the set of members is greater than a threshold; and determine the adjustment for the at least one member of the set of members to minimize the deviation of the at least one member.

\* \* \* \* \*